US012218423B2

(12) United States Patent
Zhang

(10) Patent No.: US 12,218,423 B2
(45) Date of Patent: Feb. 4, 2025

(54) ELECTRONIC DEVICE

(71) Applicant: Huawei Technologies Co., Ltd., Shenzhen (CN)

(72) Inventor: Rui Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 17/773,305

(22) PCT Filed: Oct. 15, 2020

(86) PCT No.: PCT/CN2020/121090

§ 371 (c)(1),
(2) Date: Apr. 29, 2022

(87) PCT Pub. No.: WO2021/082935

PCT Pub. Date: May 6, 2021

(65) Prior Publication Data

US 2022/0393360 A1 Dec. 8, 2022

(30) Foreign Application Priority Data

Oct. 31, 2019 (CN) ........................ 201911063267.4

(51) Int. Cl.
*H01Q 13/10* (2006.01)
*H01Q 1/22* (2006.01)
(Continued)

(52) U.S. Cl.
CPC ........... *H01Q 13/10* (2013.01); *H01Q 1/2291* (2013.01); *H01Q 1/38* (2013.01); *H01Q 1/48* (2013.01); *H01Q 5/385* (2015.01)

(58) Field of Classification Search
CPC ........ H01Q 1/2291; H01Q 1/243; H01Q 1/38; H01Q 1/48; H01Q 13/10; H01Q 21/28;
(Continued)

(56) References Cited

U.S. PATENT DOCUMENTS 9,647,338 B2 * 5/2017 Nissinen .................. H01Q 7/00
10,079,428 B2 * 9/2018 Nissinen .................. H01Q 7/00
(Continued)

FOREIGN PATENT DOCUMENTS

CN 101471486 A 7/2009
CN 103414018 A 11/2013
(Continued)

*Primary Examiner* — Thien M Le
(74) *Attorney, Agent, or Firm* — Conley Rose, P.C.

(57) ABSTRACT

An electronic device includes a substrate and an antenna apparatus. The substrate includes a grounding area. The antenna apparatus includes a first radiating element, a second radiating element, a third radiating element, a first feeding structure, and a second feeding structure that are disposed in the clearance area adjacent to the grounding area. The first radiating element and the grounding area jointly form a slot antenna. The second radiating element is separated from the grounding area. The first feeding structure and the second feeding structure are located at the clearance area and are grounded. The second feeding structure is electrically coupled between the third radiating element and the ground. The antenna apparatus feeds a radiating element using the first feeding structure and the second feeding structure to obtain resonance modes at different frequencies, thereby implementing a dual-band dual-antenna function.

19 Claims, 26 Drawing Sheets

(51) Int. Cl.
*H01Q 1/38* (2006.01)
*H01Q 1/48* (2006.01)
*H01Q 5/385* (2015.01)

(58) Field of Classification Search
CPC ............ H01Q 5/385; H01Q 5/50; H01Q 7/00; H01Q 1/22; H01Q 1/2258; H01Q 1/242; H01Q 1/36; H01Q 1/50; H01Q 1/52; C12Q 1/6827; C12Q 1/6837; C12Q 1/6841; C12Q 2565/501
See application file for complete search history.

(56) References Cited

U.S. PATENT DOCUMENTS

| | | | | |
|---|---|---|---|---|
| 10,957,980 | B2 * | 3/2021 | Liu | H01Q 9/42 |
| 2006/0290569 | A1 * | 12/2006 | Boyle | H01Q 1/243 343/702 |
| 2007/0205948 | A1 * | 9/2007 | Lee | H01Q 1/244 343/702 |
| 2009/0174607 | A1 | 7/2009 | Yan et al. | |
| 2010/0283701 | A1 * | 11/2010 | Cheng | H01Q 9/285 343/793 |
| 2015/0084817 | A1 * | 3/2015 | Yong | H01Q 5/335 343/702 |
| 2019/0081385 | A1 * | 3/2019 | Avser | H01Q 5/328 |
| 2019/0157751 | A1 | 5/2019 | Zhang et al. | |
| 2019/0393603 | A1 * | 12/2019 | Rutfors | H01Q 1/48 |
| 2022/0123456 | A1 * | 4/2022 | Chang | H01Q 1/243 |
| 2023/0411828 | A1 * | 12/2023 | Peng | H01Q 3/00 |

FOREIGN PATENT DOCUMENTS

| | | | |
|---|---|---|---|
| CN | 103794886 | A | 5/2014 |
| CN | 104051842 | A | 9/2014 |
| CN | 204230420 | U | 3/2015 |
| CN | 106252848 | A | 12/2016 |
| CN | 107645038 | A | 1/2018 |
| CN | 108598668 | A | 9/2018 |
| CN | 207994068 | U | 10/2018 |
| CN | 208507963 | U | 2/2019 |
| CN | 209344302 | U | 9/2019 |
| EP | 2811573 | A1 | 12/2014 |
| KR | 20150080391 | A | 7/2015 |
| WO | 2018028101 | A1 | 2/2018 |

* cited by examiner

ELECTRONIC DEVICE

CROSS-REFERENCE TO RELATED APPLICATIONS

This is a U.S. National Stage of International Patent Application No. PCT/CN2020/121090 filed on Oct. 15, 2020, which claims priority to Chinese Patent Application No. 201911063267.4 filed on Oct. 31, 2019. Both of the aforementioned applications are hereby incorporated by reference in their entireties.

TECHNICAL FIELD

The present invention relates to the field of antenna technologies, and in particular, to an antenna applied to an electronic device.

BACKGROUND

The fifth-generation mobile communication technology means that information is transmitted and exchanged between electronic devices (such as a mobile phone, a tablet computer, and a wearable device) at a higher speed, that is, the electronic devices have a higher communication rate. To achieve a higher information transmission speed, a device antenna that supports a plurality of frequency bands needs to be designed to support a MIMO (Multiple-Input Multiple-Output, multiple-input multiple-output) multi-antenna system.

SUMMARY

Embodiments of this application provides an electronic device with an antenna apparatus. In the embodiments of this application, the electronic device may be a terminal device such as a portable Wi-Fi device or a router, and the antenna apparatus implements a dual-band dual-antenna function.

The electronic device provided in the embodiments of this application includes a substrate and an antenna apparatus, and a feeding network in the electronic device is electrically connected to the antenna apparatus, to meet a requirement for normal working of the electronic device in different frequency bands.

In a possible implementation, the antenna apparatus is disposed on the substrate, and the substrate includes a grounding area and a clearance area that are adjacent to each other. It should be noted that all antenna apparatus components on the substrate are disposed in the clearance area of the substrate. Therefore, it may be understood that a periphery of the antenna apparatus components is the grounding area of the substrate. The antenna apparatus includes a first radiating element, a second radiating element, a third radiating element, a first feeding structure, and a second feeding structure that are disposed in the clearance area. It should be noted that, because the clearance area and the grounding area on the substrate are adjacent to each other, a periphery of the first radiating element, the second radiating element, the third radiating element, the first feeding structure, and the second feeding structure that are disposed in the clearance area is the grounding area, and a grounded part in the structure is grounded by using the adjacent grounding area on a periphery of the clearance area. An opening and two ground terminals respectively located on two sides of the opening are disposed on the first radiating element. That is, the first radiating element includes two ground terminals, where one ground terminal is located on one side of the opening, and the other ground terminal is located on the other side of the opening. The two ground terminals are electrically connected to the grounding area, so that the first radiating element and the grounding area jointly form a slot antenna. Formation of the slot antenna herein may be understood as: The first radiating element disposed in the clearance area and the grounding area adjacent to the clearance area enclose the clearance area, and the enclosed clearance area forms a structure similar to an opening slot, that is, the slot antenna is formed. In this embodiment, the second radiating element is separated from the grounding area, the second radiating element is also disposed in the clearance area, and there is no direct electrical connection or structural physical connection between the second radiating element and the grounding area.

In this embodiment, the first feeding structure and the second feeding structure are both located at an adjoining area between the grounding area and the clearance area and are grounded. The first feeding structure excites the slot antenna in a magnetic coupling manner to generate a first resonance frequency, and excites the second radiating element to generate a second resonance frequency. Excitation in the magnetic coupling manner means that there is no direct electrical connection between the first feeding structure and either of the slot antenna and the second radiating element, but a varying current flows through the first feeding structure by using an external circuit. Therefore, a varying electromagnetic field is generated, and the slot antenna and the second radiating element that are in space of the electromagnetic field are magnetically coupled to the first feeding structure, and are excited to appear in resonance statuses, which are respectively a fundamental mode of the slot antenna and a fundamental mode of the second radiating element. It should be noted that frequencies at which the slot antenna and the second radiating element are magnetically coupled to the first feeding structure are different, a frequency of the fundamental mode of the slot antenna excited in a manner of magnetic coupling between the first feeding structure and the slot antenna is the first resonance frequency, and a frequency of the fundamental mode of the second radiating element excited in a manner of magnetic coupling between the first feeding structure and the second radiating element is the second resonance frequency.

In this embodiment, the second feeding structure is electrically connected between the third radiating element and the ground. The ground herein is a floor of the grounding area of the substrate. The second feeding structure excites the third radiating element to generate the first resonance frequency, and the third radiating element is used as an excitation source to excite the slot antenna in an electrical coupling manner to generate the second resonance frequency. It should be noted that the second feeding structure is directly electrically connected to the third radiating element, the third radiating element resonates under an action of the second feeding structure, and a fundamental mode of the third radiating element is generated due to excitation. In this case, a resonance frequency is the first resonance frequency. In this case, the third radiating element is then used as the excitation source to excite the slot antenna, to cause the slot antenna to appear in a second mode. That is, the second mode of the slot antenna appears under excitation of the third radiating element, and in this case, a frequency of the slot antenna is the second resonance frequency.

In the antenna apparatus in this embodiment, the first radiating element, the second radiating element, the third radiating element, the first feeding structure, and the second feeding structure are disposed in the clearance area, and the slot antenna formed by the first radiating element and the second radiating element form a first antenna. The first feeding structure excites the fundamental mode (that is, the first resonance frequency) of the slot antenna and the fundamental mode (that is, the second resonance frequency) of the second radiating element in the magnetic coupling manner. That is, the first antenna can work at the first resonance frequency and the second resonance frequency, thereby implementing dual-band. The slot antenna formed by the first radiating element and the third radiating element form a second antenna, the second feeding structure directly feeds the third radiating element to excite the fundamental mode (that is, the first resonance frequency) of the third radiating element, and the third radiating element is used as the excitation source to excite the second mode (that is, the second resonance frequency) of the slot antenna. The second antenna can work at the first resonance frequency and the second resonance frequency, thereby also implementing dual-band, and providing a miniaturized dual-band antenna pair.

In a possible implementation, at the first resonance frequency, a resonance mode of the slot antenna and a resonance mode of the third radiating element are orthogonal in polarization. That is, at the first resonance frequency, an electric field of the fundamental mode of the slot antenna is horizontally polarized, an electric field of the fundamental mode of the third radiator element is vertically polarized, and the two resonance modes of horizontal polarization and vertical polarization are orthogonal to each other. That is, the resonance mode of the slot antenna and the resonance mode of the third radiating element at the first resonance frequency are orthogonal in polarization, thereby achieving an intra-hand high isolation effect. At the second resonance frequency, a resonance mode of the second radiating element and a resonance mode of the slot antenna are orthogonal in polarization. That is, at the second resonance frequency, an electric field of the fundamental mode of the second radiating element is horizontally polarized, an electric field of the second mode of the slot antenna is vertically polarized, and the two resonance modes are also orthogonal in polarization. That is, the resonance mode of the second radiating element and the resonance mode of the slot antenna at the second resonance frequency are orthogonal in polarization, thereby achieving a technical effect of intra-band high isolation.

In a possible implementation, the first radiating element includes a first body extending along a first direction, the two ground terminals are located at two ends of the first body, and the opening is located in a middle area of the first body; the second radiating element includes a second body extending along the first direction, and the third radiating element includes a third body and a feeding stub; the third body extends along the first direction, the feeding stub is connected between the third body and the grounding area, and an included angles formed between the feeding stub and the third body; and a junction between the feeding stub and the grounding area is the second feeding structure. In this embodiment, the first direction is a direction parallel to a plane of the substrate, and the first body extending along the first direction can ensure that the electric field of the fundamental mode of the slot antenna is horizontally polarized when the first radiating element is excited by the first feeding structure. In addition, the first body is connected to the grounding area of the substrate by using the ground terminals at the two ends of the first body. In addition, an opening dividing the first body into two segments is disposed in the middle area of the first body, and the middle area herein represents a range, that is, an area near a middle point of the first body in the extension direction. As a main working structure of the second radiating element, the second body determines intensity, a direction, and the like of an electromagnetic field generated by the second radiating element under excitation. Only if an extension direction of the second body is also the first direction, that is, parallel to a board surface of the substrate, the fundamental mode of the second radiating element may be horizontally polarized when the second radiating element is excited by the first feeding structure. Because the third radiating element is excited by the second feeding structure by using a direct electrical connection, the third radiating element includes the feeding stub connected to the second feeding structure aid the third body.

In a possible implementation, the slot antenna is in a long strip shape, a length direction of the slot antenna is the first direction, and the first feeding structure is disposed in a middle area of the slot antenna in the length direction. That is, the first feeding structure is located in the fuddle area of the slot antenna (this middle area is the middle area in the length direction). The slot antenna is formed by the first radiating element in the clearance area and the grounding area adjacent to the clearance area by enclosing the clearance area. Therefore, the length direction of the slot antenna is related to the first radiating element enclosing the slot antenna. When the length direction of the slot antenna is the first direction, it means that the slot antenna indicates that the first radiating element is used as a long side for enclosing, that is, the first radiating element is a long side of an aperture of the slot antenna. A reason for disposing the first feeding structure in the middle area of the slot antenna in the length direction is: When the slot antenna works in the fundamental mode, the middle area of the slot antenna in the length direction is a point at which a current is relatively strong, and disposing the first feeding structure at a point at which a current is relatively strong helps the fundamental mode of the slot antenna be excited by the first feeding structure.

In a possible implementation, in a second direction, a center of the first feeding structure directly faces a center of the opening, and the second direction is perpendicular to the first direction. The second direction is a direction that is parallel to the board surface of the substrate and perpendicular to the first direction. When the center of the first feeding structure directly faces the center of the opening, a grounding area corresponding to a position of the opening in the second direction is a point at which a current is relatively strong in the length direction of the slot antenna. Aligning the first feeding structure with the opening in the second direction helps the slot antenna be excited by the first feeding structure.

In a possible implementation, the first feeding structure includes a first port, a first timing element, and a connection line connected between the first port and the first tuning element; both the first port and the first tuning element are electrically connected to the grounding area, and the grounding area, the first port, the connection line, and the first tuning element jointly form an annular loop, and the annular loop can excite the slot antenna and the second radiating element in the magnetic coupling manner. The grounding area, the first port, the connection line, and the first tuning element form an annular loop. After being connected to an external current, the annular loop generates a varying electromagnetic field in space. The slot antenna and the second radiating element are excited under an action of the electromagnetic field. This excitation manner is called magnetic coupling excitation. The excited slot antenna and the excited second radiating element respectively generate fundamental modes, that is, the fundamental mode of the slot antenna and the fundamental mode of the second radiating element.

In a possible implementation, a vertical projection of the first port on the first body and a vertical projection of the first tuning element on the first body are symmetrically distributed on the two sides of the opening. The projections of the first port and the first tuning element on the first body are symmetrically distributed on the two sides of the opening, and in this case, a center of the connection line between the first port and the first tuning element coincides with the center of the opening on a second direction line. In this case, an electromagnetic field formed by the first feeding structure can better perform magnetic coupling on the slot antenna, to excite the slot antenna to generate the fundamental mode of the slot antenna.

In a possible implementation, the first body extends in a linear shape, and/or a center of the first body coincides with a center of the opening. When the center of the first body coincides with the center of the opening, the opening is located at a central position of the first body, so that the slot antenna enclosed by the first body and the grounding area is equally divided into two parts by the opening in the first direction. In this case, when the slot antenna is excited, the formed fundamental mode of the slot antenna is horizontally polarized.

In a possible implementation, the first radiating element further includes a first branch, the first branch is connected to the first body, an extension direction of the first branch forms an included angle with an extension direction of the first body, and the first branch is configured to adjust a resonance frequency of the slot antenna. A function of the first branch is to adjust the resonance frequency of the slot antenna, and the first branch with a proper size is designed through simulation by using simulation software, to adjust the resonance frequency.

In a possible implementation, the second body is located in a slot of the slot antenna or outside the slot of the slot antenna (that is, not in the slot). In an implementation, the second body and the first body are oppositely disposed on two sides of the substrate. That is, the second body is located in an area range that is of the substrate and that is occupied by the first body. A position of the second body may be adjusted to adjust a resonance frequency and a polarization direction of the second body.

In a possible implementation, the second body extends in a linear shape, and/or a connection line between a center of the second body and a center of the opening is perpendicular to the first direction. When the second body extends in a linear shape, the opening coincides with the second body in the second direction, and a structural position at which a current is relatively strong on the second body located in the slot antenna or on an edge of the slot antenna is a central area in the extension direction.

In a possible implementation, the second radiating element further includes a second branch, the second branch is connected to the second body an extension direction of the second branch forms an included angle with an extension direction of the second body, and the second branch is configured to adjust a resonance frequency of the second radiating element. A function of the second branch is to adjust the resonance frequency of the slot antenna, and the second branch with a proper size is designed through simulation by using simulation software, to adjust the resonance frequency.

In a possible implementation, the slot antenna is in a long strip shape, a length direction of the slot antenna is the first direction, and the second feeding structure is disposed in a middle area of the slot antenna in the length direction. That is, the second feeding structure is located in the middle area of the slot antenna (this middle area is the middle area of the slot antenna in the length direction). Because the second mode of the slot antenna uses the third radiating element as the excitation source, the second feeding structure feeding the third radiating element is preferably disposed in the middle area of the slot antenna in the length direction. In this way, the third radiating element can better excite the second mode of the slot antenna. The middle area herein is merely a range, indicating an area near a middle point position of the slot antenna in the length direction.

In a possible implementation, an extension direction of the feeding stub is perpendicular to the first direction, and/or a junction between the feeding stub and the third body is located at a center of the third body. The extension direction of the feeding stub is perpendicular to the first direction, and the feeding stub is connected to the center of the third body. In this case, when the third body is excited by the second feeding structure, the electric field of the obtained fundamental mode of the third radiating element is vertically polarized, and the vertically polarized fundamental mode of the third radiating element may be orthogonal to the horizontally polarized fundamental mode of the slot antenna.

In a possible implementation, the third radiating element is a three-dimensional architecture disposed on the substrate, a part of the feeding stub is coplanar with the third body, and a part of the feeding stub forms an included angle with a surface of the substrate. The three-dimensional architecture is an implementation of the third radiating element. A part of the feeding stub is coplanar with the third body, and is configured to adjust a position of the third body in the second direction. A part of the feeding stub forms an included angle with the surface of the substrate, so that a size of the included angle determines a distance between the third body and the substrate. When a size of the feeding stub is fixed, a larger included angle between the part of the feeding stub and the substrate leads to a larger distance between the third body and the substrate, and by adjusting the part of the feeding stub, a position distance between the third radiating element and the slot antenna may be changed, to change a feeding status of the antenna.

In a possible implementation, the third radiating element further includes a third stub, and the third stub is connected between a central position of the third body and the substrate, and is configured to adjust the resonance frequency of the third radiating element. If the third radiating element is a three-dimensional architecture, the third stub may also support the third body on the surface of the substrate, to ensure structural stability of the third radiating element. The third stub may include a three-dimensional architecture erected on one side of the substrate. The third stub may alternatively include a three-dimensional structure and a microstrip structure that is printed on the surface of the substrate, and a length of the third stub is changed to adjust the resonance frequency.

In a possible implementation, the third radiating element is a microstrip structure printed on the substrate. The third radiating element is formed in a printing manner, to omit erection of a spatial structure, reduce a processing process, and help control costs.

In a possible implementation, the antenna apparatus further includes two first parasitic stubs, and the two first parasitic stubs are distributed on two sides of the second feeding structure, to adjust a resonance frequency of the second antenna. The two first parasitic stubs on the two sides of the second feeding structure are symmetrically disposed to effectively adjust the resonance frequency of the second antenna, so that electric fields of the fundamental mode of the third radiating element and the second mode of the slot antenna that are generated under an excitation action of the second feeding structure are vertically polarized.

In a possible implementation, the antenna apparatus includes two second parasitic stubs, the third body includes two ends, and the two second parasitic stubs are respectively correspondingly disposed at positions of the two ends. The two second parasitic stubs are disposed at the positions of the two ends of the third body to adjust a resonance frequency of the second antenna by using the two second parasitic stubs, and a significance of symmetrical distribution lies in that when the third radiating element is excited by the second feeding structure, electric fields of the fundamental mode of the third radiating element and the second mode of the slot antenna that are generated are vertically polarized. If a second parasitic stub is added only on one side, the electric fields of the fundamental mode of the third radiating element and the second mode of the slot antenna cannot be well vertically polarized. Therefore, the fundamental mode of the third radiating element and the second mode of the slot antenna cannot be well orthogonal to the horizontally polarized fundamental mode of the slot antenna, and an intra-band high isolation effect cannot be well achieved.

In a possible implementation, the first parasitic stubs and/or the second parasitic stubs are microstrip structures printed on the substrate. The first parasitic stubs and the second parasitic stubs are manufactured in a printing manner, so that a size of the antenna apparatus is reduced. That is, in a direction perpendicular to the board surface of the substrate, the size of the antenna apparatus is related only to a thickness of the substrate, and is not affected by the first parasitic stubs and the second parasitic. In addition, the first parasitic stubs and the second parasitic stubs of the antenna are manufactured in the printing manner, so that processing difficulty may be reduced, and manufacturing costs may be reduced.

In a possible implementation, the first parasitic stubs and/or the second parasitic stubs are three-dimensional architectures disposed on a surface of the substrate. The first parasitic stubs and the second parasitic stubs of the three-dimensional architectures can perform a frequency modulation function on the second antenna, so that the third radiating element generates the fundamental mode of the third radiating element under excitation of the second feeding structure, and the second mode of the slot antenna is generated under excitation of the third radiating element. When the third radiating element is a three-dimensional architecture, the first parasitic stubs and the second parasitic stubs of the three-dimensional architectures can have a better adjustment function.

In a possible implementation, the substrate includes a first board surface and a second board surface that are oppositely disposed; the first feeding structure, the first radiating element, and the second radiating element are disposed on the first board surface, and the second radiating element is located between the first feeding structure and the first radiating element; and the second feeding structure and the third radiating element are disposed on the second board surface. On the one hand, the first radiating element located on the first board surface and the grounding area form the slot antenna through enclosing. In this case, the slot antenna is also located on the first board surface. In this way, the first feeding structure excites the slot antenna and the second radiating element that are also located on the first board surface, to obtain the fundamental mode of the slot antenna and the fundamental mode of the second radiating element. On the other hand, the third radiating element located on the second board surface is excited by the second feeding structure also located on the second board surface to obtain the fundamental mode of the third radiating element, and the slot antenna located on the first board surface uses the third radiating element as an excitation source to obtain the second mode of the slot antenna. In this way, multi-band working of the antenna apparatus is implemented.

In a possible implementation, the substrate includes a first board surface and a second board surface that are oppositely disposed; the first feeding structure and the first radiating element are disposed on the first board surface, and the second radiating element, the third radiating element, and the second feeding structure are disposed on the second board surface; and the second radiating element is a microstrip structure printed on the second board surface, and the third radiating element is a three-dimensional architecture disposed on the second board surface. On the one hand, the first radiating element located on the first board surface and the grounding area form the slot antenna through enclosing. In this case, the slot antenna is also located on the first, board surface. In this way, the first feeding structure excites the slot antenna also located on the first board surface to obtain the fundamental mode of the slot antenna, and the first feeding structure further excites the second radiating element located on the second board surface to obtain the fundamental mode of the second radiating element. On the other hand, the third radiating element located on the second board surface is excited by the second feeding structure also located on the second board surface to obtain the fundamental mode of the third radiating element, and the slot antenna located on the first board surface uses the third radiating element as an excitation source to obtain the second mode of the slot antenna. In this way, multi-band working of the antenna apparatus is implemented.

In a possible implementation, the substrate includes a first board surface and a second board surface that are oppositely disposed, the first feeding structure and the second radiating element are disposed on the first board surface, and the first radiating element, the third radiating element, and the second feeding structure are disposed on the second board surface, and the first radiating element is a microstrip structure printed on the second board surface, and the third radiating element is a three-dimensional architecture disposed on the second board surface.

In a possible implementation, the substrate includes a first board surface and a second board surface that are oppositely disposed; and the first radiating element and the second radiating element are disposed on the first board surface, and the first feeding structure, the second feeding structure, and the third radiating element are disposed on the second board surface. On the one hand, the first radiating element located on the first board surface and the grounding area form the slot antenna through enclosing. In this case, the slot antenna is also located on the first board surface. In this way, the first feeding structure located on the second board surface excites the slot antenna and the second radiating element that are located on the first board surface, to obtain the fundamental mode of the slot antenna and the fundamental mode of the second radiating element. On the other hand, the third radiating element located on the second board surface is excited by the second feeding structure also located on the second board surface to obtain the fundamental mode of the third radiating element, and the slot antenna located on the first board surface uses the third radiating element as an excitation source to obtain the second mode of the slot antenna. In this way, multi-band working of the antenna apparatus is implemented.

In a possible implementation, the first feeding structure, the second feeding structure, the first radiating element, the second radiating element, and the third radiating element are disposed on a same side of the substrate. The first radiating element located on one side of the substrate and the grounding area form the slot antenna through enclosing. The first feeding structure located on a same board surface side as the slot antenna excites the slot antenna and the second radiating element, to obtain the fundamental mode of the slot antenna and the fundamental mode of the second radiating element. On the other hand, the third radiating element located on the same board surface side is excited by the second feeding structure also located on the side to obtain the fundamental mode of the third radiating element, and the slot antenna uses the third radiating element as an excitation source to obtain the second mode of the slot antenna. In this way, multi-hand working of the antenna apparatus is implemented.

DESCRIPTION OF EMBODIMENTS

The following clearly describes embodiments of this application with reference to accompanying drawings.

Figure 1:
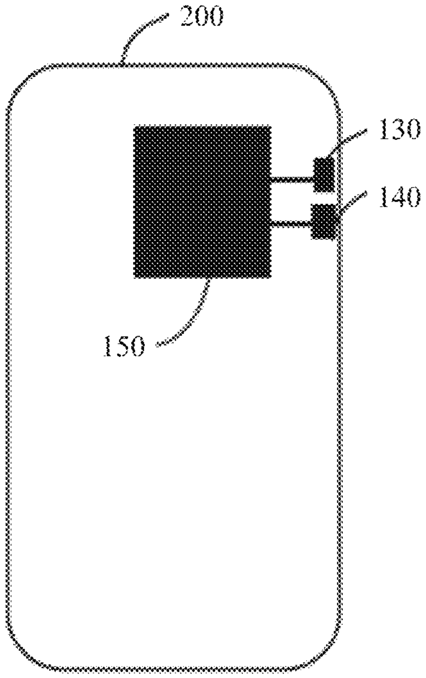
FIG. 1 is a diagram of a scenario of an antenna apparatus according to an embodiment of the present invention.

Referring to FIG. 1, an embodiment of this application provides an electronic device 200. The electronic device 200 includes a feeding network 150 and an antenna apparatus 100. The antenna apparatus 100 includes a plurality of antennas. In this embodiment, the antenna apparatus 100 includes a first antenna 130 and a second antenna 140, and the first antenna 130 and the second antenna 140 are electrically connected to the feeding network 150 by using a feeding structure of the antenna apparatus 100. The feeding structure excites the first antenna 130 and the second antenna 140 by using signal input of the feeding network 150, to obtain resonance modes of the first antenna 130 and the second antenna 140 at different frequencies, thereby meeting a requirement for normal working of the antenna apparatus 100 in different frequency bands.

The electronic device 200 provided in an embodiment of this application may be a terminal device such as a portable Wi-Fi device or a home router. The antenna apparatus 100 may implement a dual-band Wi-Fi function, for example, work in a Wi-Fi 2.4 GHz frequency band and a Wi-Fi 5 GHz frequency band.

Figure 2:
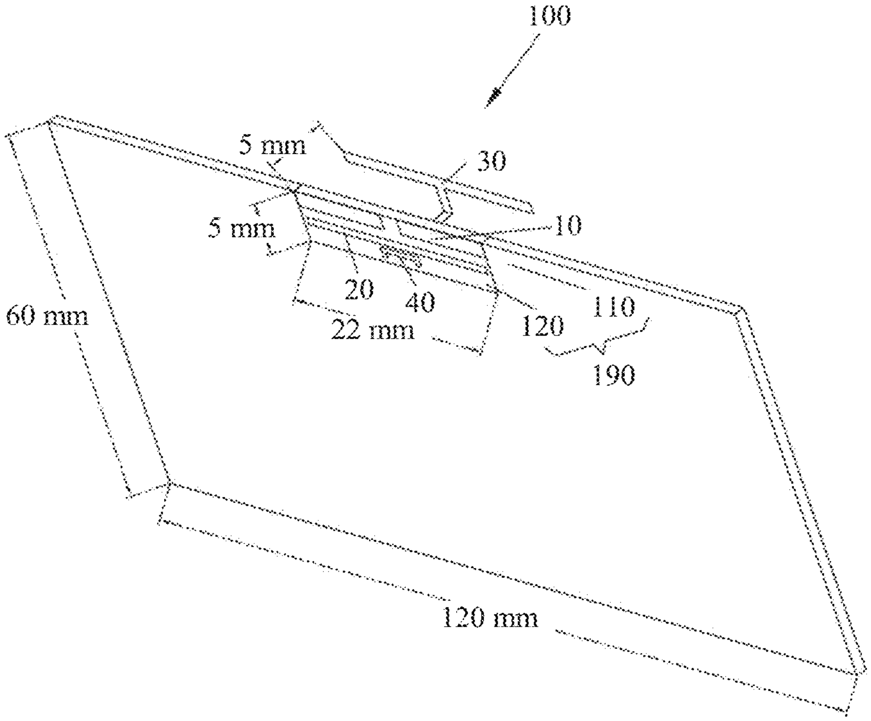
FIG. 2 is a schematic diagram of a structure of an antenna apparatus according to an embodiment of the present invention.
Figure 3:
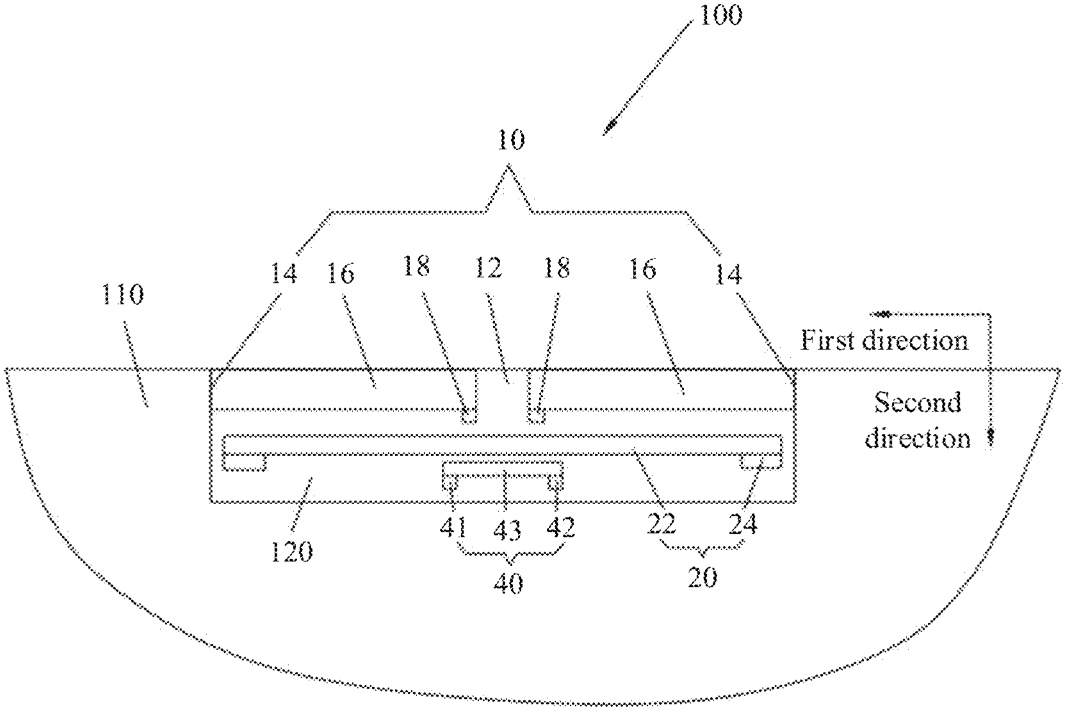
FIG. 3 is a diagram of a structure of a first antenna on one side of a substrate according to an embodiment of the present invention.
Figure 4:
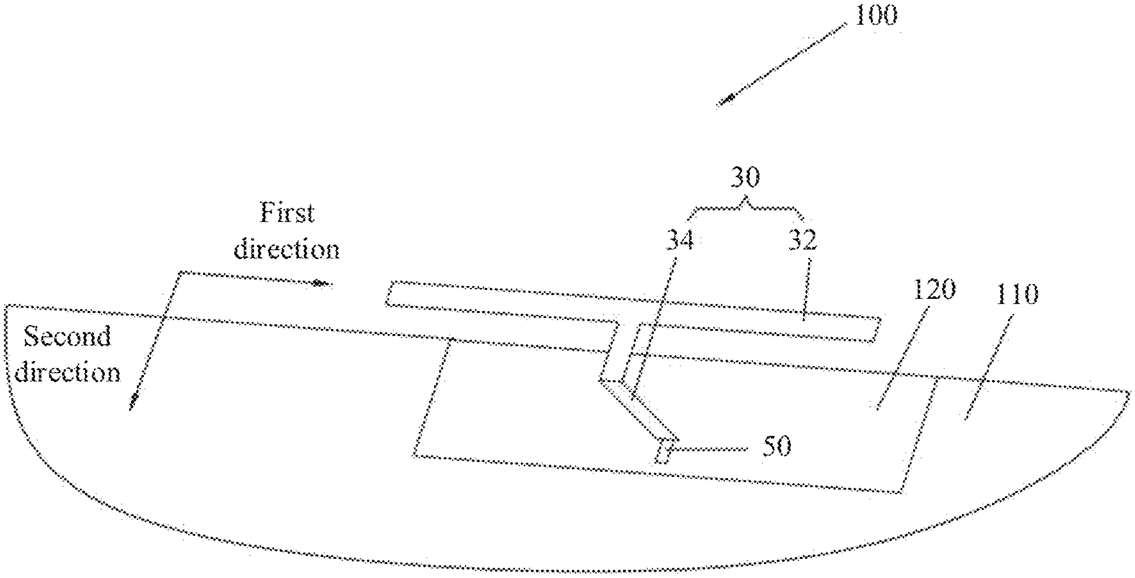
FIG. 4 is a diagram of a structure of a second antenna on the other side of the substrate according to an embodiment of the present invention.

In a possible implementation, as shown in FIG. 2, FIG. 3, and FIG. 4, the antenna apparatus 100 is disposed on a substrate 190, and the substrate 190 includes a grounding area 110 and a clearance area 120 that are adjacent to each other. It should be noted that a component of the antenna apparatus 100 is disposed in space in which the clearance area 120 of the substrate 190 is located, and the space may include a surface layer and an inner layer of the substrate 190, or may include a space range corresponding to the clearance area 120 on two sides of the substrate 190, because the antenna apparatus 100 may be a microstrip structure printed on the substrate or a spatial three-dimensional structure erected on a surface of the substrate. It may be understood that a periphery of the antenna apparatus 100 is the grounding area 110 of the substrate 190. The antenna apparatus 100 includes a first radiating element 10, a second radiating element 20, a third radiating element 30, a first feeding structure 30, and a second feeding structure 40 that are disposed in the clearance area 120. It should be noted that, because the clearance area 120 and the grounding area 110 on the substrate 190 are adjacent to each other, a periphery of the first radiating element 10, the second radiating element 20, the third radiating element 30, the first feeding structure 30, and the second feeding structure 40 that are disposed in the clearance area 120 is the grounding area 110, and a grounded part in the structure is grounded by using the adjacent rounding area 110 on a periphery of the clearance area 120. An opening 12 and two ground terminals 14 respectively located on two sides of the opening 12 are disposed on the first radiating element 10. The two ground terminals 14 are electrically connected to the grounding area 110, and the ground terminal 14 may be directly connected to the grounding area 110, or a capacitive element or an inductive element, such as a capacitor or an inductor, may be disposed between the ground terminal 14 and the grounding area 110. The first radiating element 10 and the wounding area 110 jointly form a slot antenna. The formed slot antenna 130 herein may be understood as a slot jointly formed through enclosing by the first radiating element 10 disposed in the clearance area 120 and the grounding area 110 adjacent to the clearance area 120. Because the opening is disposed on the first radiating element 10, the slot antenna 130 is a slot structure with an opening. In this embodiment, the second radiating element 20 is separated from the grounding area 11, the second radiating element 20 is also disposed in the clearance area 120, and there is no direct electrical connection or structural physical connection between the second radiating element 20 and the grounding area 110. The second radiating element 20 may be considered as a suspended metal wire structure disposed in the clearance area 120, and a suspended metal wire may be understood as a microstrip printed on the substrate or a three-dimensional metal strip structure erected on the substrate. "Suspension" means that there is no connection to the surrounding grounding area or another radiating element.

In this embodiment, the first feeding structure 40 and the second feeding structure 50 are both located at an adjoining area between the grounding area 110 and the clearance area 120 and are grounded. The first feeding structure 40 excites the slot antenna in a magnetic coupling manner to generate a first resonance frequency, and excites the second radiating element 20 to generate a second resonance frequency. Excitation in the magnetic coupling manner means that there is no direct electrical connection between the first feeding structure 40 and either of the slot antenna and the second radiating element 20, but a varying current flows through the first feeding structure 40 by using an external circuit. Therefore, a varying electromagnetic field is generated, and the slot antenna and the second radiating element 20 that are in space of the electromagnetic field are magnetically coupled to the first feeding structure 40, and are excited to appear in resonance statuses, which are respectively a fundamental mode of the slot antenna and a fundamental mode of the second radiating element 20. It should be noted that frequencies at which the slot antenna and the second radiating element 20 are magnetically coupled to the first feeding structure 40 are different, a frequency of the fundamental mode of the slot antenna excited in a manner of magnetic coupling between the first feeding structure 40 and the slot antenna is the first resonance frequency, and a frequency of the fundamental mode of the second radiating element 20 excited in a manner of magnetic coupling between the first feeding structure 40 and the second radiating element 20 is the second resonance frequency.

In this embodiment, the second feeding structure 50 is electrically connected between the third radiating element 30 and the ground. The ground herein is a floor of the grounding area 110 of the substrate 190. The second feeding structure 50 excites the third radiating element 30 to generate the first resonance frequency, and the third radiating element 30 is used as an excitation source to excite the slot antenna in an electrical coupling manner to generate the second resonance frequency. It should be noted that the second feeding structure 50 is directly electrically connected to the third radiating element 30, the third radiating element 30 resonates under an action of the second feeding structure 50, and a fundamental mode of the third radiating element 30 is generated due to excitation. A resonance frequency is the first resonance frequency. The third radiating element 30 is then used as the excitation source to excite the slot antenna, to cause the slot antenna to appear in a second mode. That is, the second mode of the slot antenna appears under excitation of the third radiating element 30, and a resonance frequency of the slot antenna is the second resonance frequency.

In the antenna apparatus 100 in this embodiment, the first radiating element 10, the second radiating element 20, the third radiating element 30, the first feeding structure 40, and the second feeding structure 50 are disposed in the clearance area 120, and the slot antenna formed by the first radiating element 10 and the second radiating element 20 form a first antenna 130. The first feeding structure 40 excites the fundamental mode (that is, the first resonance frequency) of the slot antenna and the fundamental mode (that is, the second resonance frequency) of the second radiating element 20 in the magnetic coupling manner. That is, the first antenna 130 can work at the first resonance frequency and the second resonance frequency, thereby implementing dual-band. The slot antenna formed by the first radiating element 10 and the third radiating element 30 form a second antenna 140, the second feeding structure 40 directly feeds the third radiating element 30 to excite the fundamental mode (that is, the first resonance frequency) of the third radiating element 30, and the third radiating element 30 is used as the excitation source to excite the second mode (that is, the second resonance frequency) of the slot antenna. The second antenna 140 can work at the first resonance frequency and the second resonance frequency, thereby also implementing dual-band, and providing a miniaturized dual-band antenna pair.

Figure 7:
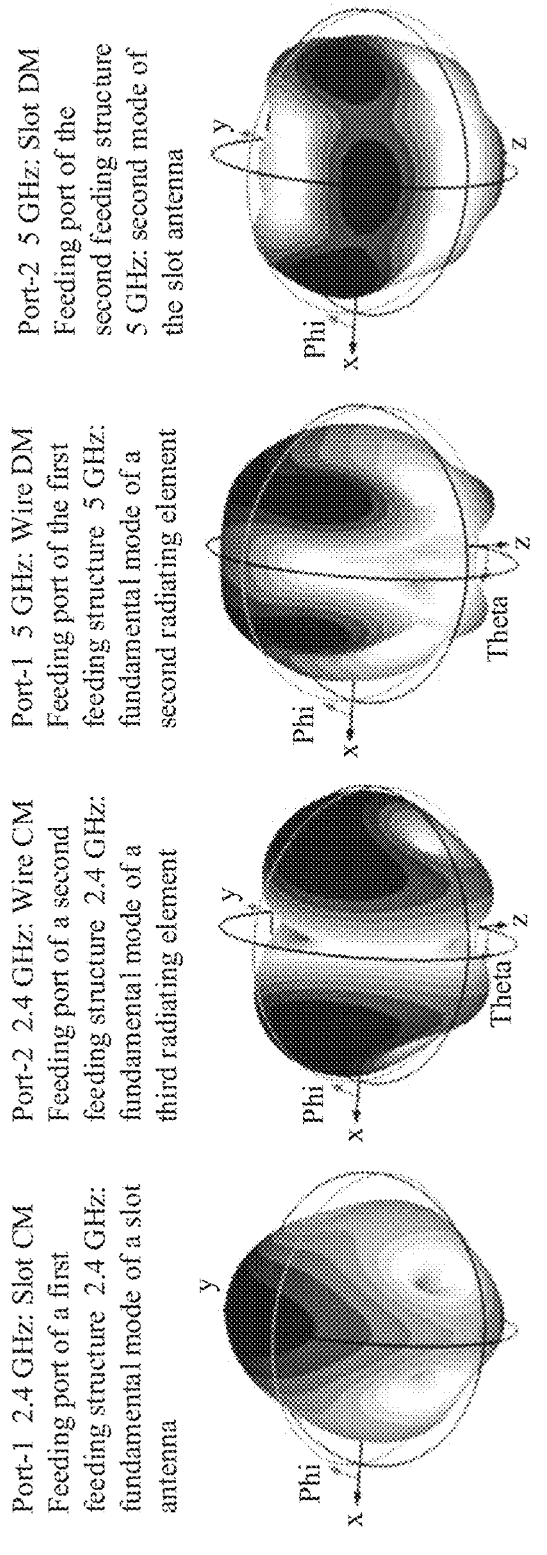
FIG. 7 is directivity patterns of two antennas according to an embodiment of the present invention.
Figure 8:
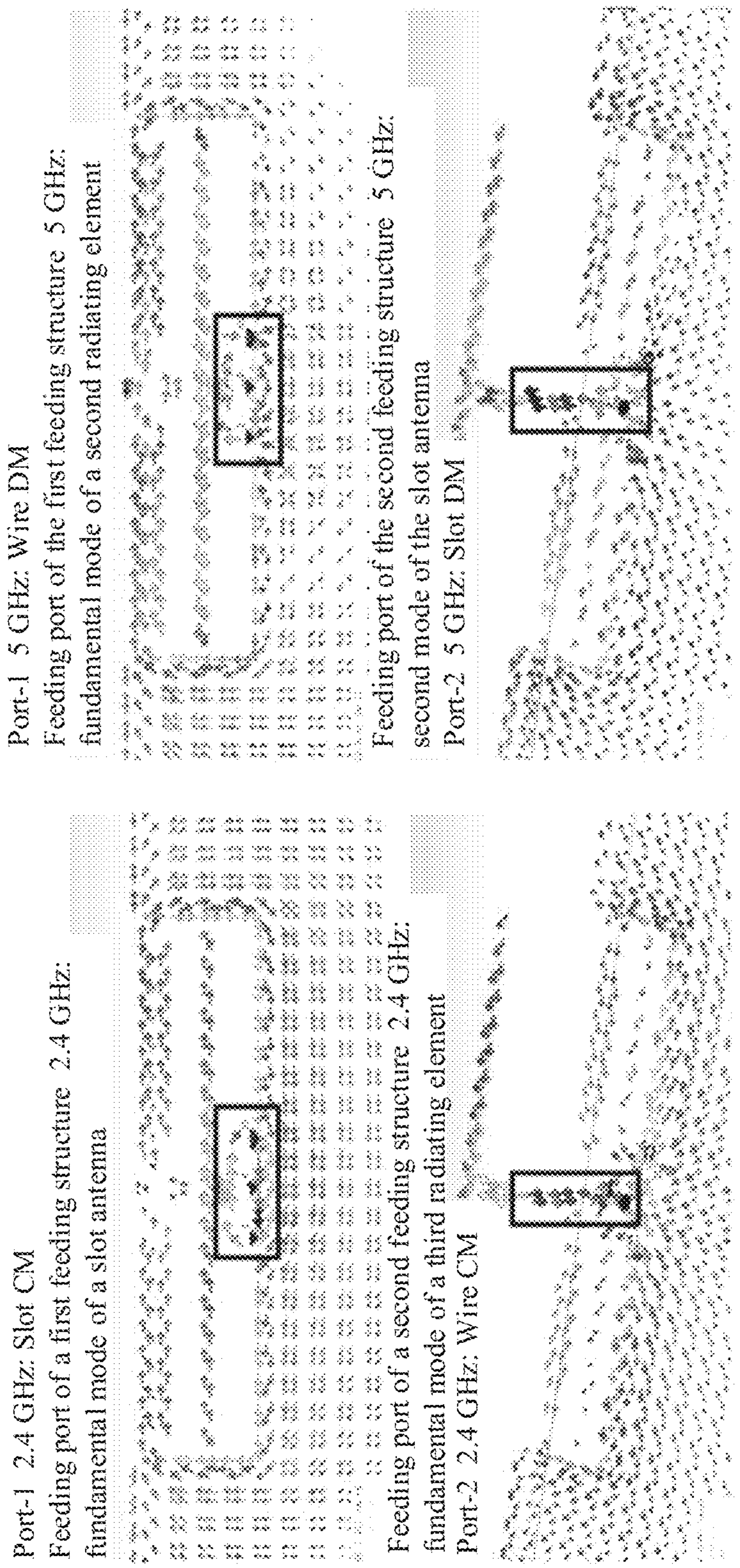
FIG. 8 is a current distribution diagram of an antenna apparatus according to an embodiment of the present invention.

As shown in FIG. 7 and FIG. 8, Port 1 represents a feeding port of the first feeding structure, Port 2 represents a feeding port of the second feeding structure, Slot CM represents the fundamental mode of the slot antenna, Wire DM represents the fundamental mode of the second radiating element, Wire CM represents the fundamental mode of the third radiating element, and Slot DM represents the second mode of the slot antenna. The four circuit distribution diagrams in FIG. 8 respectively represent a current distribution diagram when the feeding port of the first feeding structure feeds power so that the fundamental mode of the slot antenna covers a 2.4 GHz Wi-Fi signal, a current distribution diagram when the feeding port of the first feeding structure feeds power so that the fundamental mode of the second radiating element covers a 5 GHz Wi-Fi signal, a current distribution diagram when the feeding port of the second feeding structure feeds power so that the fundamental mode of the third radiating element covers a 2.4 GHz Wi-Fi signal, and a current distribution diagram when the feeding port of the second feeding structure feeds power so that the second mode of the slot antenna covers a 5 GHz Wi-Fi signal.

As shown in FIG. 8, distribution of points in the figure represents simulated current distribution of the first radiating element 10, the second radiating element 20, and the third radiating element 30, and an area circled by a dotted line is an area in which a current is relatively strong. The slot antenna forms a current loop under an action of the first feeding structure 40, and the current loop may be equivalent to a magnetic current. The first feeding structure 40 is placed at a position at which a current is relatively strong on the first radiating element 10 and the second radiating element 20 (that is, an area in which a current is relatively strong in the grounding area 110), so that fundamental modes of the two radiators (that is, the fundamental mode of the slot antenna and the fundamental mode of the second radiating element 20) can be excited in the magnetic coupling manner. Resonance frequencies of the two radiation modes are different, and therefore are in two frequency bands. In this case, the first antenna 130, formed by the second radiating element 20 and the slot antenna formed by the first radiating element 10, may implement dual-band working. Similarly, for the second antenna 140, formed by the third radiating element 30 and the slot antenna formed by the first radiating element 10, the third radiating element 30 obtains a fundamental mode in one frequency band through direct feeding of the second feeding structure 50. Then, the third radiating element 30 is used as an excitation source of the slot antenna, and the third radiating element 30 is disposed at a position at which an electric field of the second mode of the slot antenna is relatively strong, so that electrical coupling is generated, and the slot antenna is excited to obtain a second mode of the first radiating element 10. The second antenna 140 may also implement dual-band working.

In this embodiment, sizes of the first antenna and the second antenna are related to the fundamental mode of the slot antenna, the fundamental mode of the second radiating element, the fundamental mode of the third radiating element, and the second mode of the slot antenna. Therefore, in a state of the fundamental mode of the slot antenna, a size of the slot antenna in a length direction (a size extending in a first direction) is a quarter wavelength, and sizes of the second radiating element and the third radiating element in the first direction are also a quarter wavelength in a corresponding resonance frequency status. Sizes of the first antenna and the second antenna extending in the first direction are greater than sizes of the first antenna and the second antenna extending in another direction. By using the design of an embodiment of this application, the sizes of the first antenna and the second antenna may be controlled, to facilitate a miniaturization design.

In a specific implementation, as shown in FIG. 2, a Wi-Fi antenna is used as an example. A panel of the substrate 190 is a rectangle, a length of the rectangle is 120 mm, and a width of the rectangle is 60 mm. In other words, a panel size of the substrate 190 is 120 mm*60 mm. The size of the slot antenna in the first direction is 22 mm, and a size of the slot antenna in a second direction is 5 mm. Because the second radiating element 20 is located in the slot antenna, a size of the first antenna is 22 mm*5 mm. In a direction perpendicular to the panel of the substrate 190, a size of the electrical radiating element 30 is 5 mm. Therefore, it may be concluded that a total size of the first antenna formed by the slot antenna and the second radiating element 20 and the second antenna formed by the slot antenna and the third radiating element 30 is 22 mm*5 mm*5 mm. In this embodiment, the slot antenna is fed by the first feeding structure 40 in the magnetic coupling manner, and at 2.4 GHz, the slot antenna requires only one quarter wavelength to generate a first resonance mode. If a common direct feeding manner is used, a half wavelength is required to generate the first resonance mode. That is, a length of the slot antenna in the first direction in an embodiment of this application is reduced by half than a length of the slot antenna in a common feeding mode, thereby greatly reducing design space.

Figure 5:
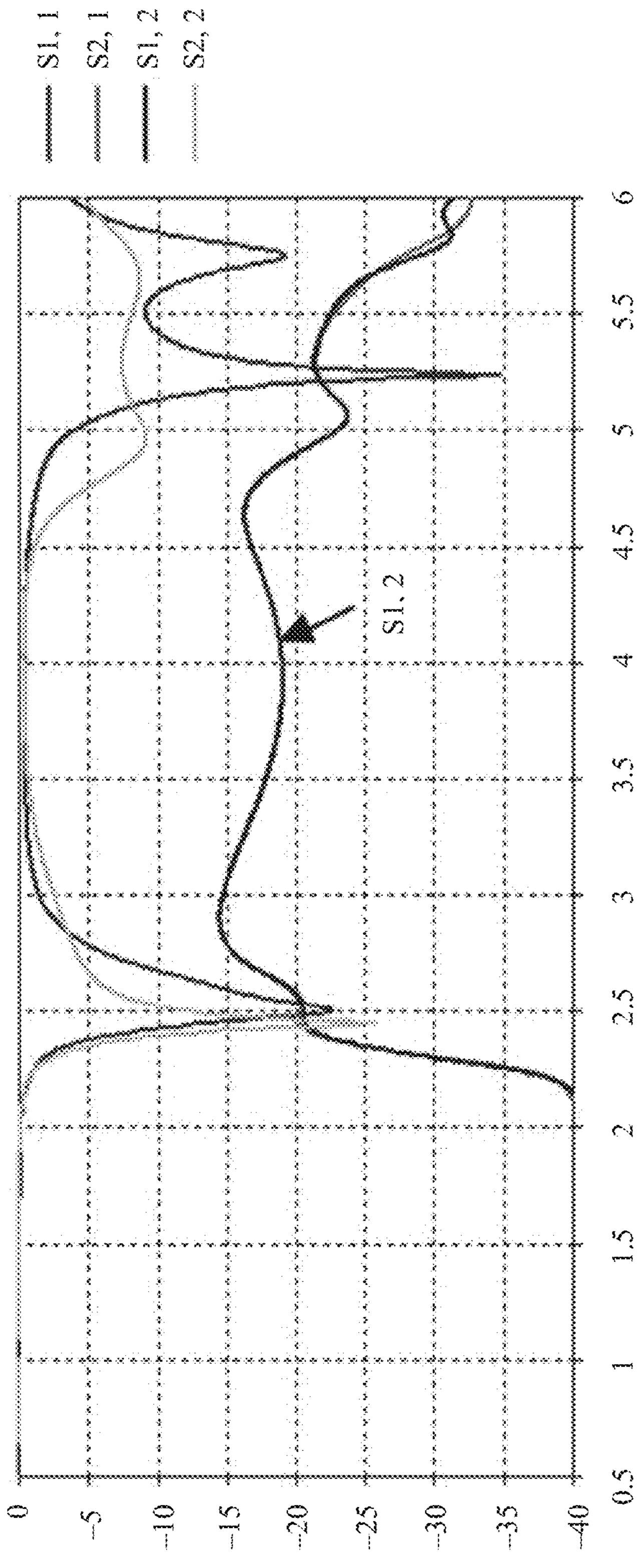
FIG. 5 is a diagram of S-parameter simulation of an antenna apparatus according to an embodiment of the present invention.
Figure 6:
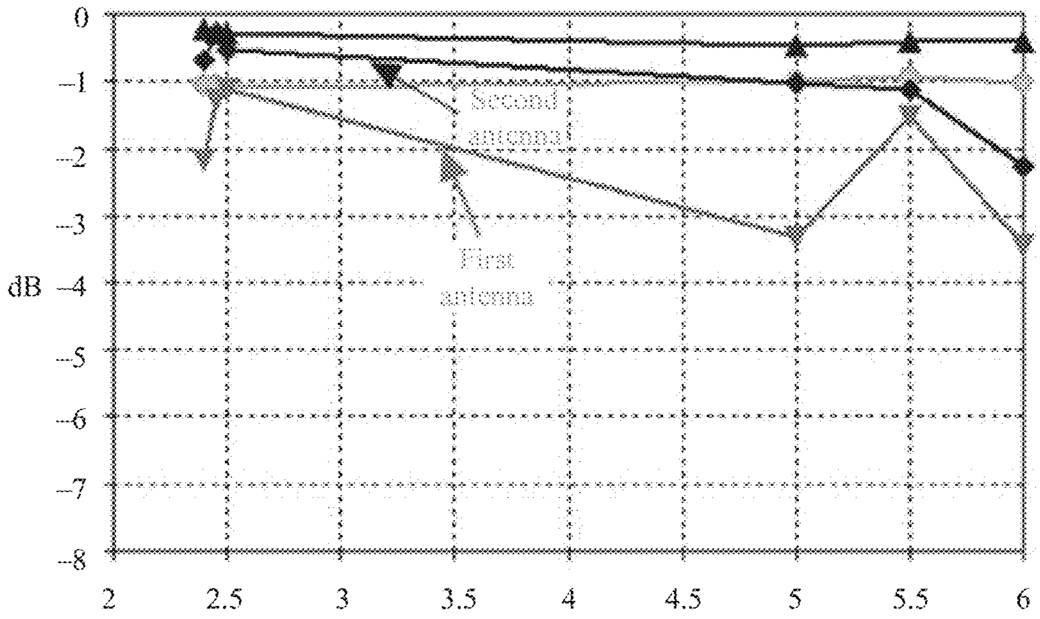
FIG. 6 is a diagram of simulation efficiency of two antennas according to an embodiment of the present invention.

A parameter simulation result of an antenna is shown in FIG. 5. It may be learned that bandwidth of the antenna can well cover a range of Wi-Fi 2.4 GHz and 5 GHz frequency bands, and isolation between the two frequency bands is greater than 15 dB. FIG. 6 is a diagram of simulation efficiency of the antenna apparatus. It may be learned from the diagram that values at two frequencies 2.4 GHz and 5 GHz are both greater than −3 dB, which meets a requirement of normal use of the antenna. FIG. 7 shows directivity patterns of the first antenna and the second antenna at the frequencies 2.4 GHz and 5 GHz. Specifically, Port 1 is used as a feeding port of the first feeding structure, the fundamental mode (Slot CM) of the slot antenna and the fundamental mode (Wire DM) of the second radiating element that are of the first antenna are excited at the two frequencies 24 GHz, and 5 GHz, and corresponding directivity factor values are 4.127 dBi and 4.926 dBi. Port 2 is used as a feeding port of the second feeding structure, the fundamental mode (Wire CM) of the third radiating element and the second mode (Slot DM) of the slot antenna that are of the second antenna are excited at the two frequencies 2.4 GHz and 5 GHz, and corresponding directivity factor values are 4.344 dBi and 5.999 dBi. Therefore, the antenna apparatus meets a working requirement of a dual-hand antenna.

In a possible implementation, at the first resonance frequency, a resonance mode of the slot antenna and a resonance mode of the third radiating element are orthogonal in polarization. That is, at the first resonance frequency, an electric field of the fundamental mode of the slot antenna is horizontally polarized, an electric field of the fundamental mode of the third radiator element is vertically polarized, and the two resonance modes of horizontal polarization and vertical polarization are orthogonal to each other. That is, the resonance mode of the slot antenna and the resonance mode of the third radiating element at the first resonance frequency are orthogonal in polarization, thereby achieving an intra-band high isolation effect. At the second resonance frequency, a resonance mode of the second radiating element and a resonance mode of the slot antenna are orthogonal in polarization. That is, at the second resonance frequency, an electric field of the fundamental mode of the second radiating element is horizontally polarized, an electric field of the second mode of the slot antenna is vertically polarized, and the two resonance modes are also orthogonal in polarization. That is, the resonance mode of the second radiating element and the resonance mode of the slot antenna at the second resonance frequency are orthogonal in polarization, thereby achieving a technical effect of intra-band high isolation. In the technical solution in this embodiment, the resonance modes of the first antenna and the second antenna are orthogonal in polarization in different frequency bands, thereby achieving a working effect of high isolation in different frequency bands of the antenna apparatus 100.

In a possible implementation, as shown in FIG. 3 and FIG. 4, the first radiating element 10 includes a first body 16 extending along a first direction, the two ground terminals 14 are located at two ends of the first body 16, and the opening 12 is located in a middle area of the first body 16; the second radiating element 20 includes a second body 22 extending along the first direction, and the third radiating element includes a third body 32 and a feeding stub 34; the third body 32 extends along the first direction, the feeding stub 34 is connected between the third body 32 and the grounding area 110, and an included angle (the included angle may be 90 degrees, that is, the feeding stub 34 may be perpendicular to the third body 32) is formed between the feeding stub 34 and the third body 32; and a junction between the feeding stub 34 and the grounding area 110 is the second feeding structure 50. In an embodiment, the first direction may be a direction parallel to an edge of a board surface of the substrate 190, and the first body 16 extending along the first direction can ensure that the electric field of the fundamental mode of the slot antenna is horizontally polarized when the first radiating element 10 is excited by the first feeding structure 40. The first body 16 is connected to the grounding area 110 of the substrate 190 by using the ground terminals 14 at the two ends of the first body 16. An opening 12 dividing the first body 16 into two segments is disposed in the middle area of the first body 16, and the middle area herein represents a range, that is, an area near a middle point of the first body 16 in the extension direction. As a main working structure of the second radiating element 20, the second body 22 determines intensity, a direction, and the like of an electromagnetic field generated by the second radiating element 20 under excitation. An extension direction of the second body 20 is set to the first direction, that is, parallel to the first body 16, so that the fundamental mode of the second radiating element 20 may be horizontally polarized when the second radiating element 20 is excited by the first feeding structure 40. Because the third radiating element 30 is excited by the second feeding structure 50 by using a direct electrical connection, the third radiating element 30 includes the feeding stub 34 connected to the second feeding structure 50 and the third body 32.

Specifically, as shown in FIG. 3 and FIG. 4, extension directions of the first body 16, the second body 22, and the third body 32 are the same, that is, the first body 16, the second body 22, and the third body 32 are parallel to each other. The extension direction of the first body 16 determines an extension direction of the first radiating element 10, an extension direction of the slot antenna enclosed by the first radiating element 10 and the grounding area 110, a direction of the electric field of the fundamental mode of the slot antenna, and a direction of the electric field of the second mode of the slot antenna. The extension direction of the second body 22 determines an extension direction of the second radiating element 20 and a direction of the electric field of the fundamental mode of the second radiating element 20. The extension direction of the third body 32 determines an extension direction of the third radiating element 30 and a direction of the electric field of the fundamental mode of the third radiating element 30. To ensure that the fundamental mode of the slot antenna and the fundamental mode of the third radiating element 30 are orthogonal in polarization, and the fundamental mode of the second radiating element 20 and the second mode of the slot antenna are orthogonal in polarization, the first body 16, the second body 22, and the third body 32 are enabled to be parallel to each other, so that a relatively good orthogonal effect may be achieved, thereby obtaining relatively high antenna isolation.

In a possible implementation, as shown in FIG. 3, the slot antenna is in a long strip shape, a length direction of the slot antenna is the first direction, and the first feeding structure 40 is disposed in a middle area of the slot antenna in the length direction. The slot antenna is formed by the first radiating element 10 in the clearance area 120 and the grounding area 110 adjacent to the clearance area 120 by enclosing the clearance area 120. Therefore, the length direction of the slot antenna is related to the first radiating element 10 enclosing the slot antenna. When the length direction of the slot antenna is the first direction, it means that the slot antenna indicates that the first radiating element 10 is used as a long side for enclosing, that is, the first radiating element is a long side of an aperture of the slot antenna. A reason for disposing the first feeding structure 40 in the middle area of the slot antenna in the length direction is: When the slot antenna works, the middle area of the slot antenna in the length direction is a point at which a current is relatively strong, and disposing the first feeding structure 40 at a point at which a current is relatively strong helps the slot antenna be excited by the first feeding structure 40.

In a possible implementation, as shown in FIG. 3, in a second direction, a center of the first feeding structure 40 directly faces a center of the opening 12, and the second direction is perpendicular to the first direction. The second direction is a direction that is parallel to the board surface of the substrate 190 and perpendicular to the first direction. When the center of the first feeding structure 40 directly faces the center of the opening 12, a grounding area corresponding to a position of the opening 12 in the second direction is a point at which a current is relatively strong in the length direction of the slot antenna. Aligning the first feeding structure 40 with the opening 12 in the second direction helps the slot antenna be excited by the first feeding structure 40.

In a possible implementation, as shown in FIG. 3, the first feeding structure 40 includes a first port 41, a first tuning element 42, and a connection line 43 connected between the first port 41 and the first timing element 42; both the first port 41 and the first tuning element 42 are electrically connected to the grounding area 110; and the grounding area 110, the first port 41, the connection line 42, and the first tuning element 75 jointly form an annular loop, and the annular loop can excite the slot antenna and the second radiating element 20 in the magnetic coupling manner. The grounding area 110, the first port 41, the connection line 43, and the first tuning element 42 form an annular loop. After being connected to an external current, the annular loop generates a varying electromagnetic field in space. The slot antenna and the second radiating element 20 are excited under an action of the electromagnetic field. This excitation manner is called magnetic coupling excitation. The excited slot antenna and the excited second radiating element 20 respectively generate fundamental modes, that is, the fundamental mode of the slot antenna and the fundamental mode of the second radiating element 20.

In a possible implementation, as shown in FIG. 3, a vertical projection of the first port 41 on the first body 16 and a vertical projection of the first tuning element 42 on the first body 16 are symmetrically distributed on the two sides of the opening 12. The projections of the first port 41 and the first tuning element 42 on the first body 16 are symmetrically distributed on the two sides of the opening 12, and in this case, a center of the connection line between the first port 41 and the first tuning element 42 coincides with the center of the opening 12 on a second direction line. In this case, an electromagnetic field formed by the connection line 43 can better perform magnetic coupling on the slot antenna, to excite the slot antenna to generate the fundamental mode of the slot antenna.

In a possible implementation, as shown in FIG. 3, the first body 16 extends in a linear shape, and/or a center of the first body 16 coincides with a center of the opening 12. When the center of the first body 16 coincides with the center of the opening 12, the opening 12 is located at a central position of the first body 16, so that the slot antenna enclosed by the first body 16 and the grounding area 110 is equally divided into two parts by the opening 12 in the first direction. In this case, when the slot antenna is excited, the formed fundamental mode of the slot antenna is horizontally polarized.

In a possible implementation, as shown in FIG. 3, the first radiating element 10 further includes a first branch 18, the first branch 18 is connected to the first body 16, an extension direction of the first branch 18 forms an included angle with an extension direction of the first body 16, and the first branch 18 is configured to adjust a resonance frequency of the slot antenna. As shown in FIG. 3, the first branch 18 is disposed at positions near to the two sides of the opening 12. In this way, the first branch 18 increases a hole depth of the opening 12, thereby further facilitating adjustment of the resonance frequency of the slot antenna. In this embodiment, the first branch 18 is configured to adjust the resonance frequency of the slot antenna, and the first branch 18 with a proper size is designed through simulation by using simulation software, to adjust the resonance frequency.

In a possible implementation, as shown in FIG. 3, the second body 22 is located in a slot of the slot antenna or on a slot edge of the slot antenna. That the second body 22 is located in the slot of the slot antenna or on the slot edge of the slot antenna means that the second body 22 is not connected to the first body 16 and the grounding area 110 that enclose the slot antenna. In this case, the second body 22 may be better excited by the first feeding structure 40, to obtain the fundamental mode of the second radiating element 20.

As shown in FIG. 3, the second body 22 extends in a linear shape, and/or a connection line between a center of the second body 22 and a center of the opening 12 is perpendicular to the first direction. In a possible implementation, when the second body 22 extends in a linear shape, the opening 12 coincides with the second body 22 in the second direction, and a structural position at which a current is relatively strong on the second body 22 located in the slot antenna or on an edge of the slot antenna is a central area in the extension direction.

In a possible implementation, as shown in FIG. 3, the second radiating element 20 further includes a second branch 24, the second branch 24 is connected to the second body 22, an extension direction of the second branch 24 forms an included angle with an extension direction of the second body 22, and the second branch 24 is configured to adjust a resonance frequency of the second radiating element 20. A function of the second branch 24 is to adjust the resonance frequency of the slot antenna, and the second branch 24 with a proper size is designed through simulation by using simulation software, to adjust the resonance frequency.

In a possible implementation, as shown in FIG. 3 and FIG. 4, the slot antenna is in a long strip shape, a length direction of the slot antenna is the first direction, and the second feeding structure 50 is disposed in a middle area of the slot antenna in the length direction. It should be noted that the second feeding structure 50 and the slot antenna may be distributed on different board surfaces. Therefore, if the second feeding structure 50 is on a front surface and the slot antenna is on a rear surface, an area that is of a front panel and that corresponds to the middle area of the slot antenna in the length direction on a rear panel is a position at which the second feeding structure 50 is located. In any case, because the second mode of the slot antenna uses the third radiating element as the excitation source, the second feeding structure 50 feeding the third radiating element 30 is preferably disposed in the middle area of the slot antenna in the length direction. In this way, the third radiating element 30 can better excite the second mode of the slot antenna. The middle area herein is merely a range, indicating an area near a middle point position of the slot antenna in the length direction.

As shown in FIG. 4, an extension direction of the feeding stub 34 is perpendicular to the first direction, and/or a junction between the feeding stub 34 and the third body 30 is located at a center of the third body 30. In a possible implementation, the extension direction of the feeding stub 34 is perpendicular to the first direction, and the feeding stub 34 is connected to the center of the third body 32. In this case, when the third body 32 is excited by the second feeding structure 50, the electric field of the obtained fundamental mode of the third radiating element 30 is vertically polarized, and the vertically polarized fundamental mode of the third radiating element 30 may be orthogonal to the horizontally polarized fundamental mode of the slot antenna.

In a possible implementation, as shown in FIG. 4, the third radiating element 30 is a three-dimensional architecture disposed on the substrate 190, a part of the feeding stub 34 is coplanar with the third body 32, and a part of the feeding stub 34 forms an included angle with a surface of the substrate 190. The three-dimensional architecture is an implementation of the third radiating element 30. A part of the feeding stub 34 is coplanar with the third body 32, and is configured to adjust a position of the third body 32 in the second direction. A part of the feeding stub 34 forms an included angle with the surface of the substrate, so that a size of the included angle determines a distance between the third body 30 and the substrate 190. When a size of the feeding stub 34 is fixed, a larger included angle between the part of the feeding stub and the substrate 190 leads to a larger distance between the third body 32 and the substrate 190, and by adjusting the part of the feeding stub, a position distance between the third radiating element 30 and the slot antenna may be changed, to change a feeding status of the antenna.

Figure 10:
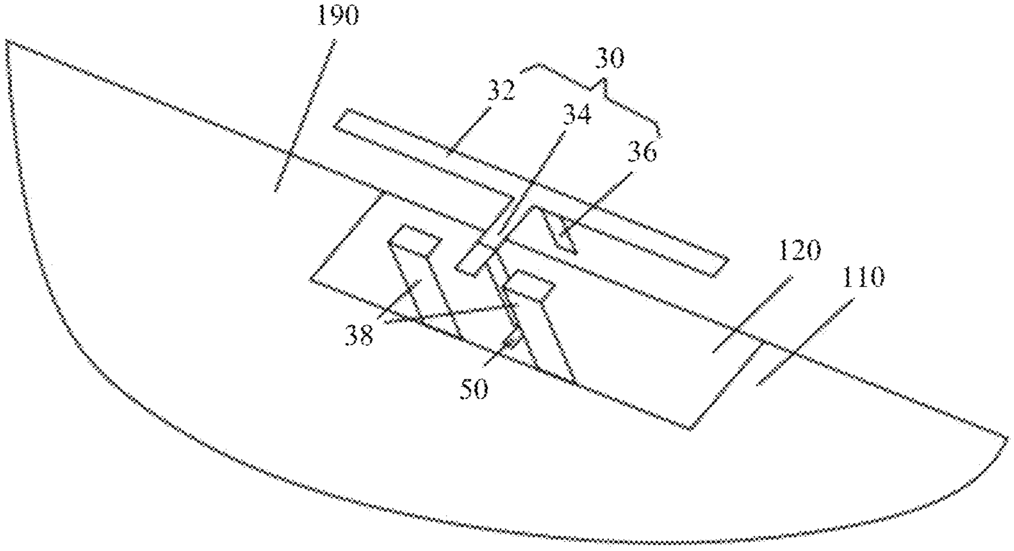
FIG. 10 is a diagram of a structure of a parasitic stub according to an embodiment of the present invention.

In a possible implementation, as shown in FIG. 10, the third radiating element 30 further includes a third stub 36, and the third stub 36 is connected between a central position of the third body 32 and the substrate 190, and is configured to adjust the resonance frequency of the third radiating element 30. If the third radiating element is a three-dimensional architecture, the third stub 36 may also support the third body 32 on the surface of the substrate, to ensure structural stability of the third radiating element 30. The third stub 36 may include a three-dimensional architecture erected on one side of the substrate. The third stub 36 may alternatively include a three-dimensional structure and a microstrip structure that is printed on the surface of the substrate, and a length of the third stub 36 is changed to adjust the resonance frequency.

Figure 9:
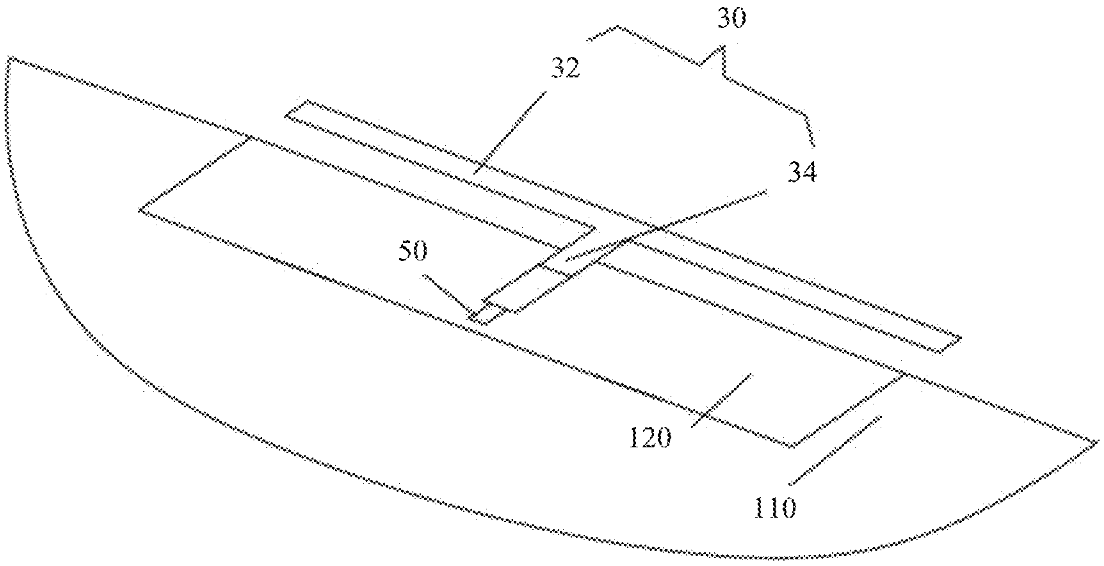
FIG. 9 is a diagram of a structure of a third radiating element according to an embodiment of the present invention.

In a possible implementation, as shown in FIG. 9, the third radiating element 30 is a microstrip structure printed on the substrate 190. The third radiating element 30 is formed in a printing manner, to omit erection of a spatial structure, reduce a processing process, and help control costs.

In a possible implementation, as shown in FIG. 10, the antenna apparatus 100 further includes two first parasitic stubs 38, and the two first parasitic stubs 38 are distributed on two sides of the second feeding structure 50, to adjust a resonance frequency of the second antenna 140. The first parasitic stubs 38 on the two sides of the second feeding structure 50 are symmetrically disposed to effectively adjust the resonance frequency of the second antenna 140, so that electric fields of the fundamental mode of the third radiating element 30 and the second mode of the slot antenna that are generated under an excitation action of the second feeding structure 50 are vertically polarized.

Figure 11:
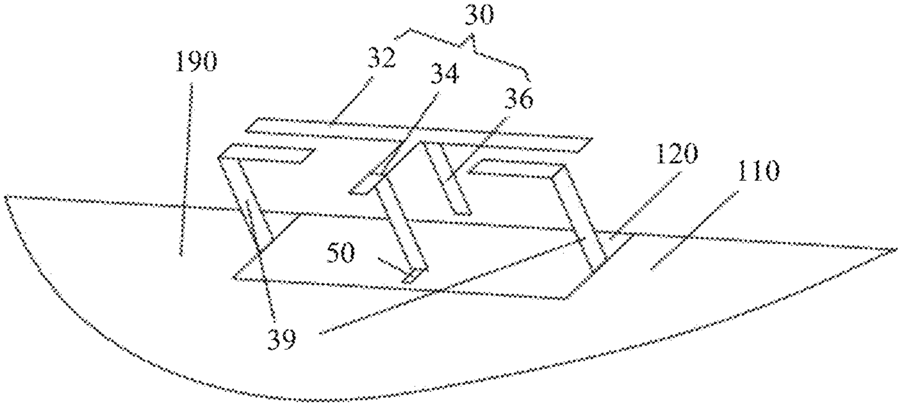
FIG. 11 is a diagram of a structure of a parasitic stub according to another embodiment of the present invention.

In a possible implementation, as shown in FIG. 11, the antenna apparatus 100 includes two second parasitic stubs 39, the third body 32 includes two ends, and the two second parasitic stubs 39 are respectively correspondingly disposed at positions of the two ends. The two second parasitic stubs 39 are disposed at the positions of the two ends of the thud body 32 to adjust a resonance frequency of the second antenna 140 by using the two second parasitic stubs 39, and a significance of symmetrical distribution lies in that when the second antenna 140 is excited by the second feeding structure, electric fields of the fundamental mode of the third radiating element 30 and the second mode of the slot antenna that are generated are vertically polarized. If a second parasitic stub 39 is added only on one side, the electric fields of the fundamental mode of the third radiating element 30 and the second mode of the slot antenna cannot be well vertically polarized. Therefore, the fundamental mode of the third radiating element 30 and the second mode of the slot antenna cannot be well orthogonal to the fundamental mode of the slot antenna and the fundamental mode of the second radiating element 20 that are horizontally polarized, and an intra-hand high isolation effect cannot be well achieved.

Figure 12:
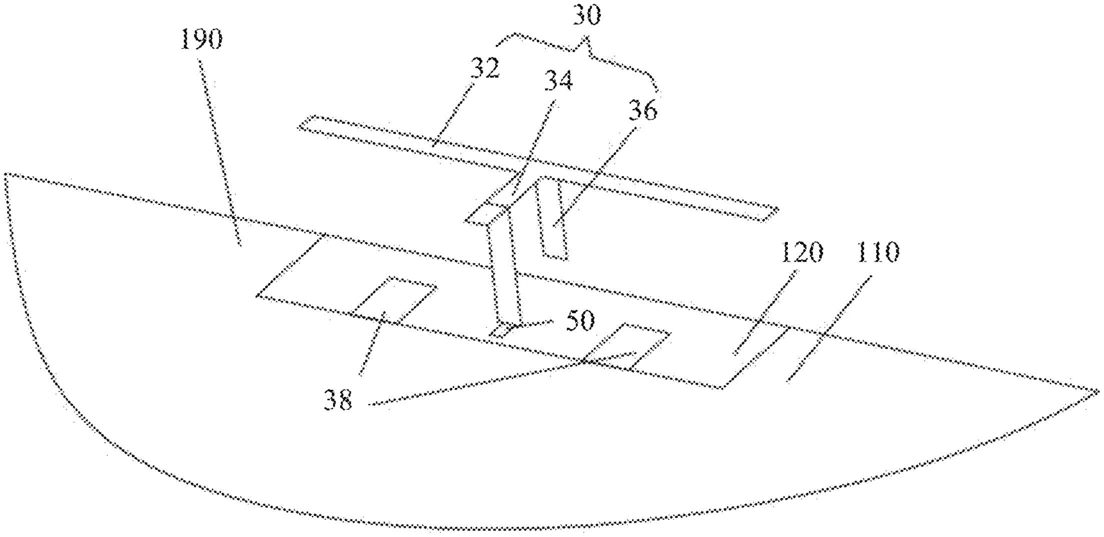
FIG. 12 is a diagram of a structure of a parasitic stub according to another embodiment of the present invention.

In a possible implementation, the first parasitic stubs 38 and/or the second parasitic stubs 39 are microstrip structures printed on the substrate 190. Specifically, as shown in FIG. 12, the first parasitic stubs 38 are manufactured in a printing manner, so that a size of the antenna apparatus 100 is reduced. That is, in a direction perpendicular to the board surface of the substrate 190, the size of the antenna apparatus 100 is related only to a thickness of the substrate 190, and is not affected by the first parasitic stubs 38. In addition, the first parasitic stubs 38 of the antenna are manufactured in the printing manner, so that processing difficulty may be reduced, and manufacturing costs may be reduced.

In a possible implementation, as shown in FIG. 10 and FIG. 11, the first parasitic stubs 38 and/or the second parasitic stubs 39 are three-dimensional architectures disposed on a surface of the substrate 190. The first parasitic stubs 38 and the second parasitic stubs 39 of the three-dimensional architectures can perform a frequency modulation function on the second antenna 140, so that the third radiating element 30 generates the fundamental mode of the third radiating element 30 under excitation of the second feeding structure 50, and the second mode of the slot antenna is generated under excitation of the third radiating element. When the third radiating element 30 is a three-dimensional architecture, the first, parasitic stubs 38 and the second parasitic stubs 39 of the three-dimensional architectures can have a better adjustment function.

Figure 13A:
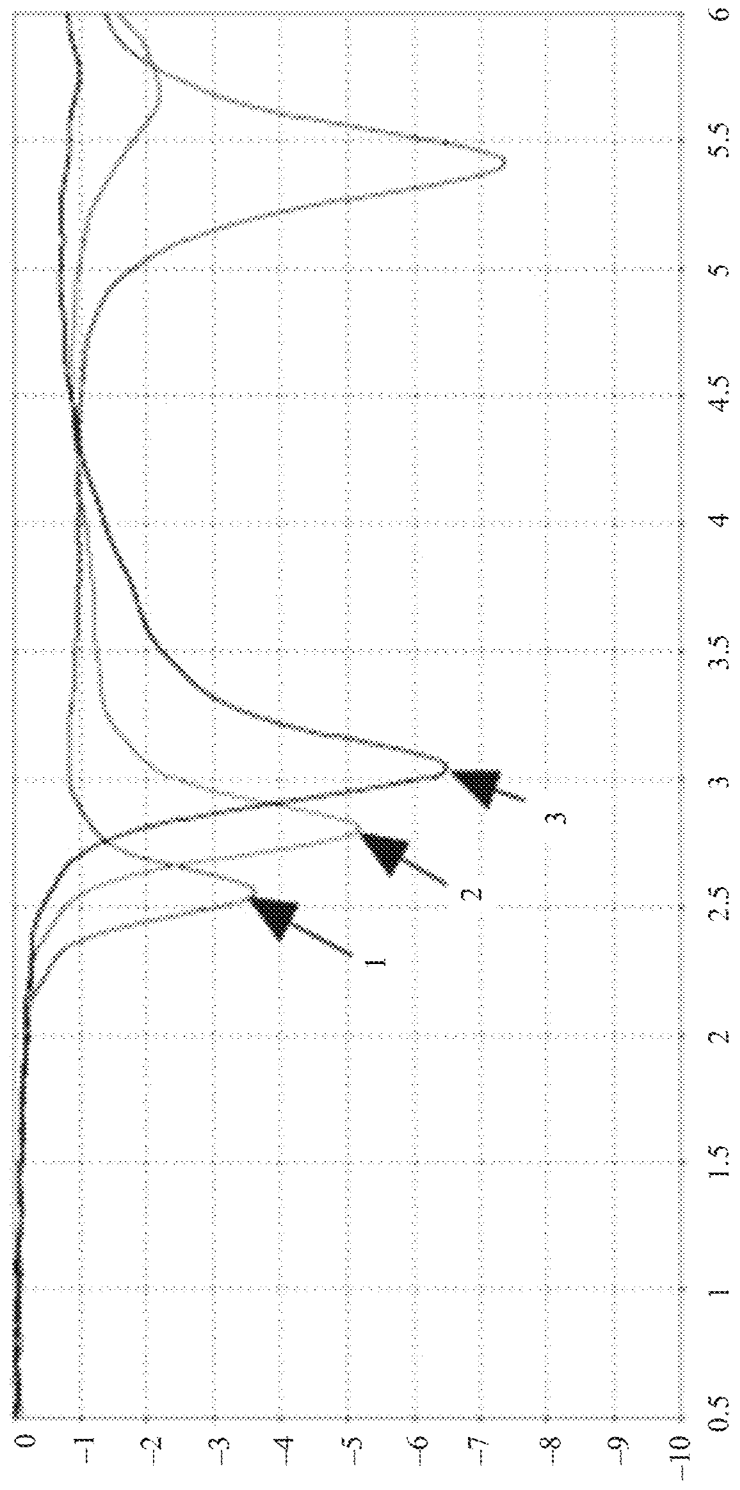
FIG. 13A is a diagram of S-parameter simulation of a first antenna when a size of an opening is changed according to an embodiment of the present invention.
Figure 13B:
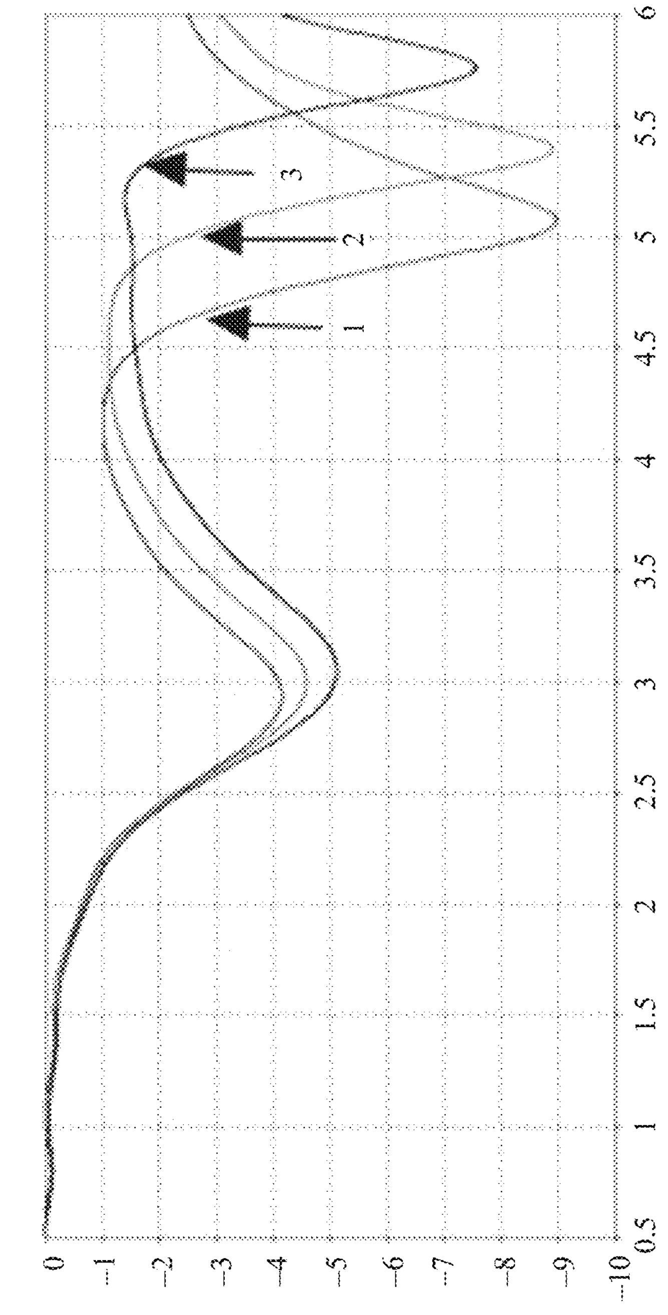
FIG. 13B is a diagram of S-parameter simulation of a second antenna when a size of an opening is changed according to an embodiment of the present invention.

It should be noted that, in the foregoing specific embodiment, sizes of components of the antenna apparatus 100 may be adjusted, to adjust S parameters of the first antenna and the second antenna. Specific cases are as follows:

In a first case, a size of the opening on the first radiating element is adjusted, to adjust the S parameters of the first antenna and the second antenna. As shown in FIG. 13A and FIG. 13B, sizes of the opening that are represented by a curve 1, a curve 2, and a curve 3 are in an increasing trend. FIG. 13A is a diagram showing a variation of an S parameter of the first antenna when the size of the opening is changed. It may be learned from the diagram that when the opening becomes larger, a resonance frequency of the first antenna moves toward a higher frequency, and when the opening becomes smaller, the resonance frequency of the first antenna moves toward a lower frequency. FIG. 13B is a diagram showing a variation of an S parameter of the second antenna when the size of the opening is changed. It may be learned from the diagram that when the opening becomes larger, a resonance frequency of the second antenna moves toward a higher frequency, and when the opening becomes smaller, the resonance frequency of the second antenna moves toward a lower frequency.

Figure 14A:
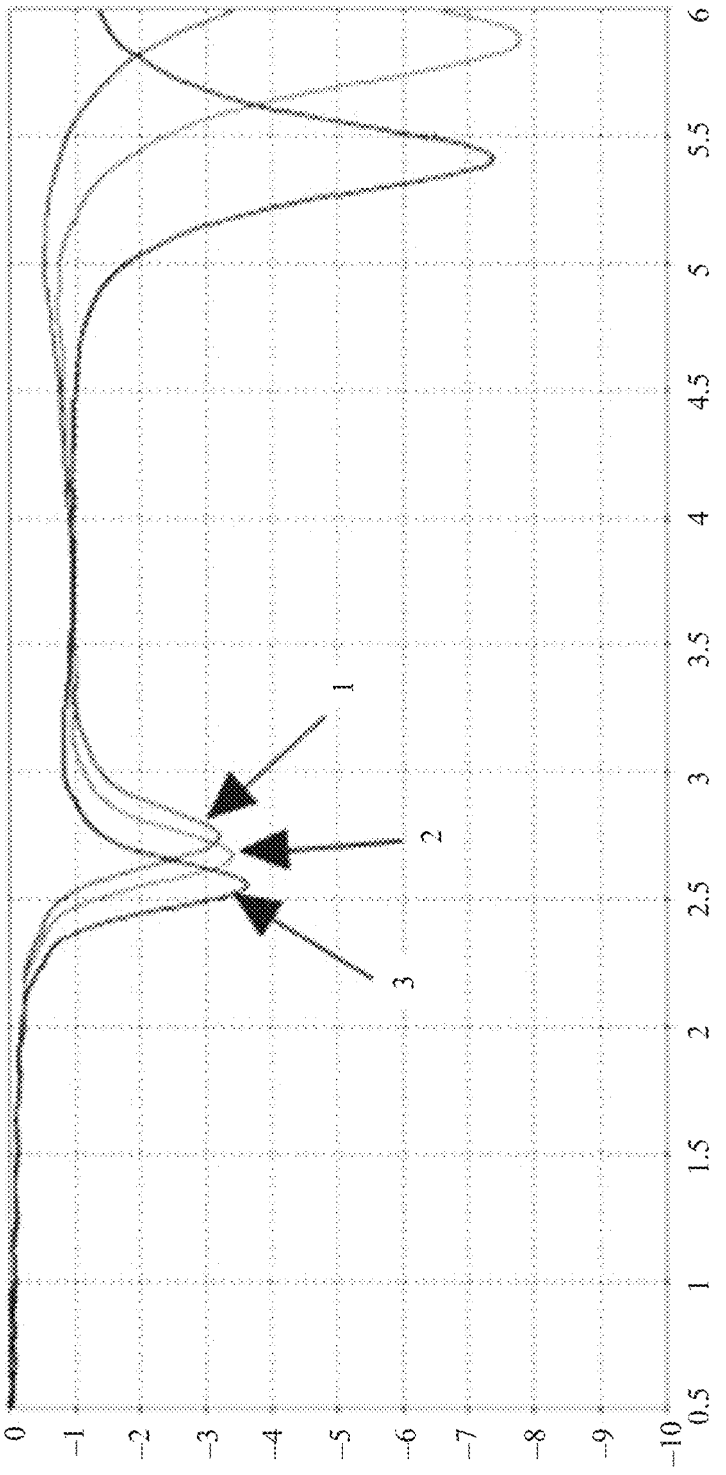
FIG. 14A is a diagram of S-parameter simulation of a first antenna when a size of a second radiating element is changed according to an embodiment of the present invention.
Figure 14B:
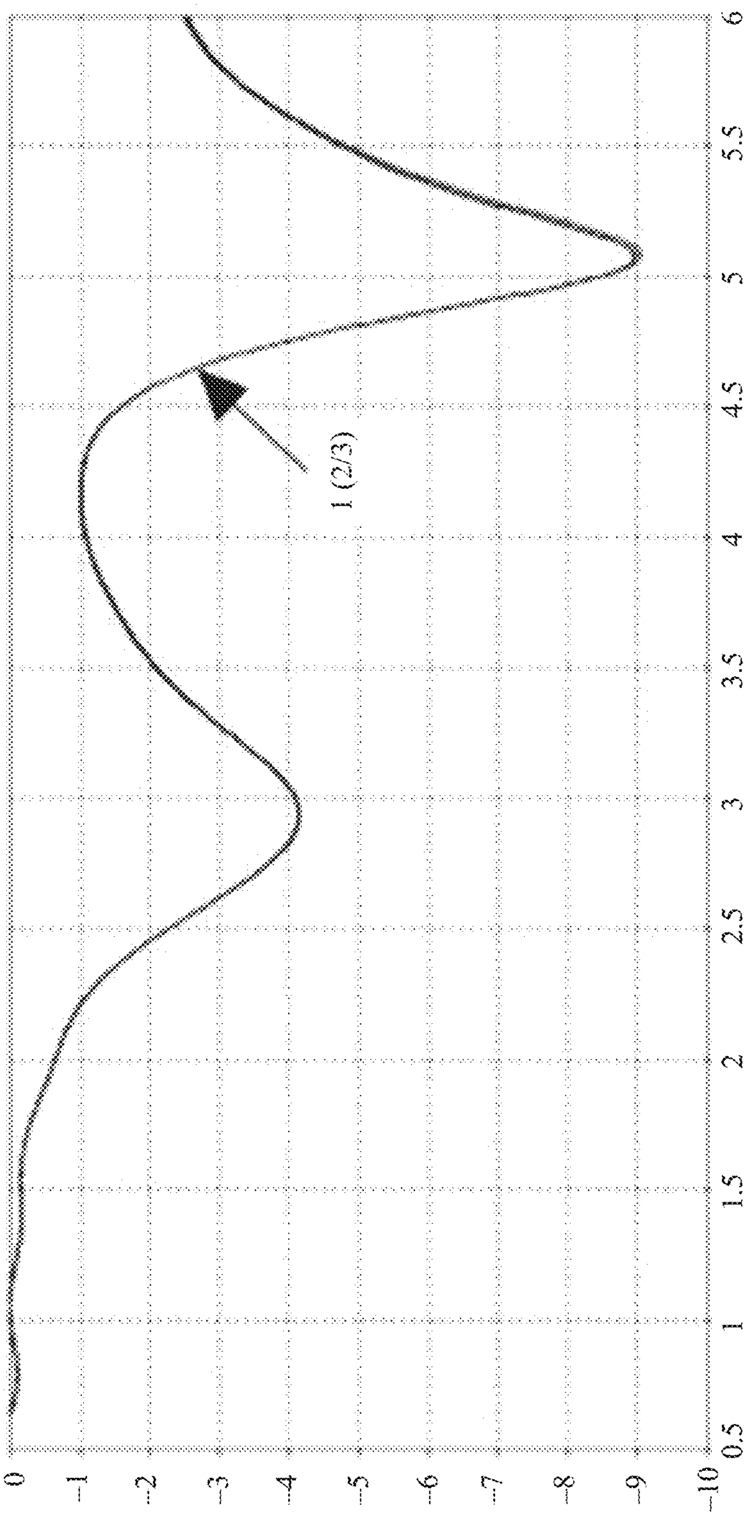
FIG. 14B is a diagram of S-parameter simulation of a second antenna when a size of a second radiating element is changed according to an embodiment of the present invention.

In a second case, a size of the second radiating element along the first direction is adjusted, to adjust the S parameters of the first antenna and the second antenna. As shown in FIG. 14A and FIG. 14B, sizes of the second radiating element that are represented by a curve 1, a curve 2, and a curve 3 are in an increasing trend. FIG. 14A is a diagram showing a variation of an S parameter of the first antenna when the size of the second radiating element along the first direction is changed. It may be learned from the diagram that when the size of the second radiating element along the first direction becomes larger, a resonance frequency of the first antenna moves toward a lower frequency, and when the size of the second radiating element along the first direction becomes smaller, the resonance frequency of the first antenna moves toward a higher frequency. FIG. 14B is a diagram showing a variation of an S parameter of the second antenna when the size of the second radiating element along the first direction is changed. It may be learned from the diagram that a change of the size of the second radiating element along the first direction has little impact on a resonance frequency of the second antenna.

Figure 15A:
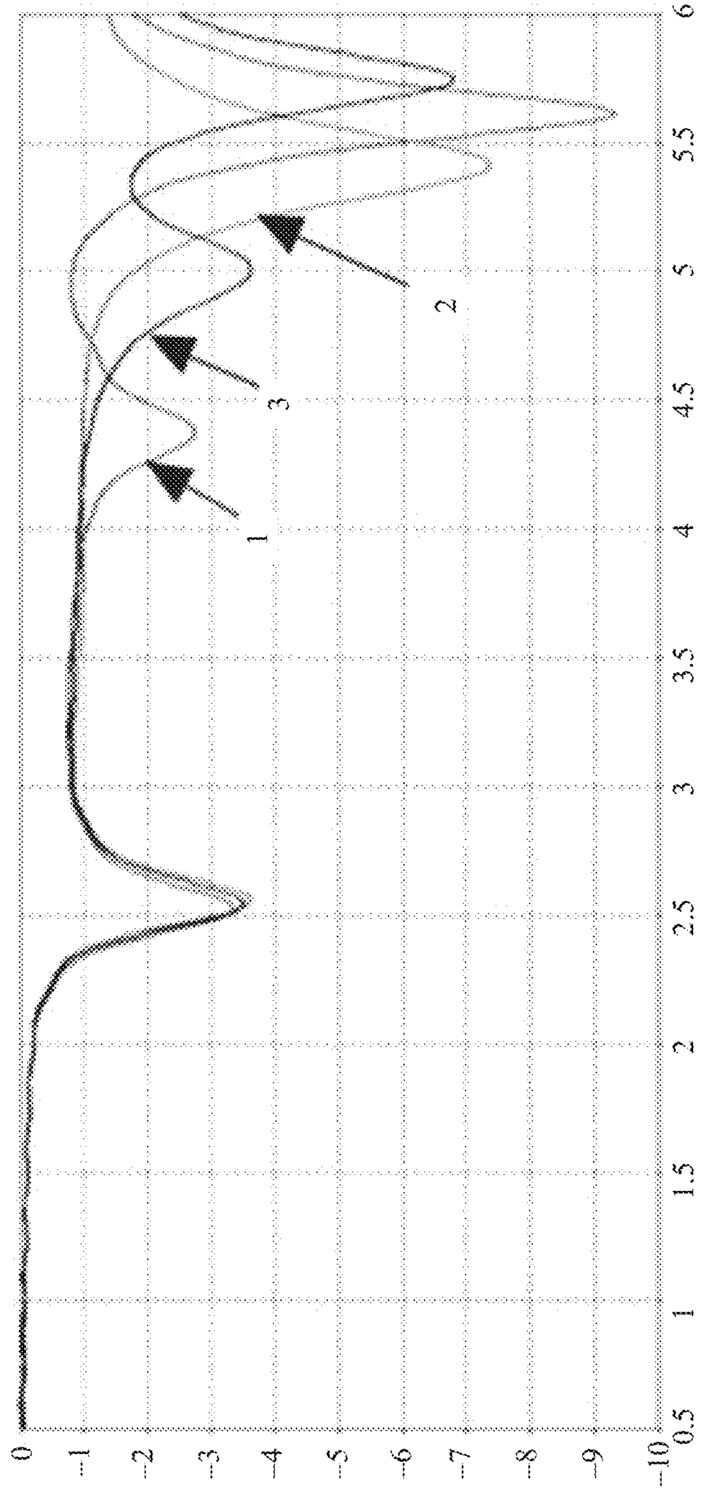
FIG. 15A is a diagram of S-parameter simulation of a first antenna when a size of a third body is changed according to an embodiment of the present invention.
Figure 15B:
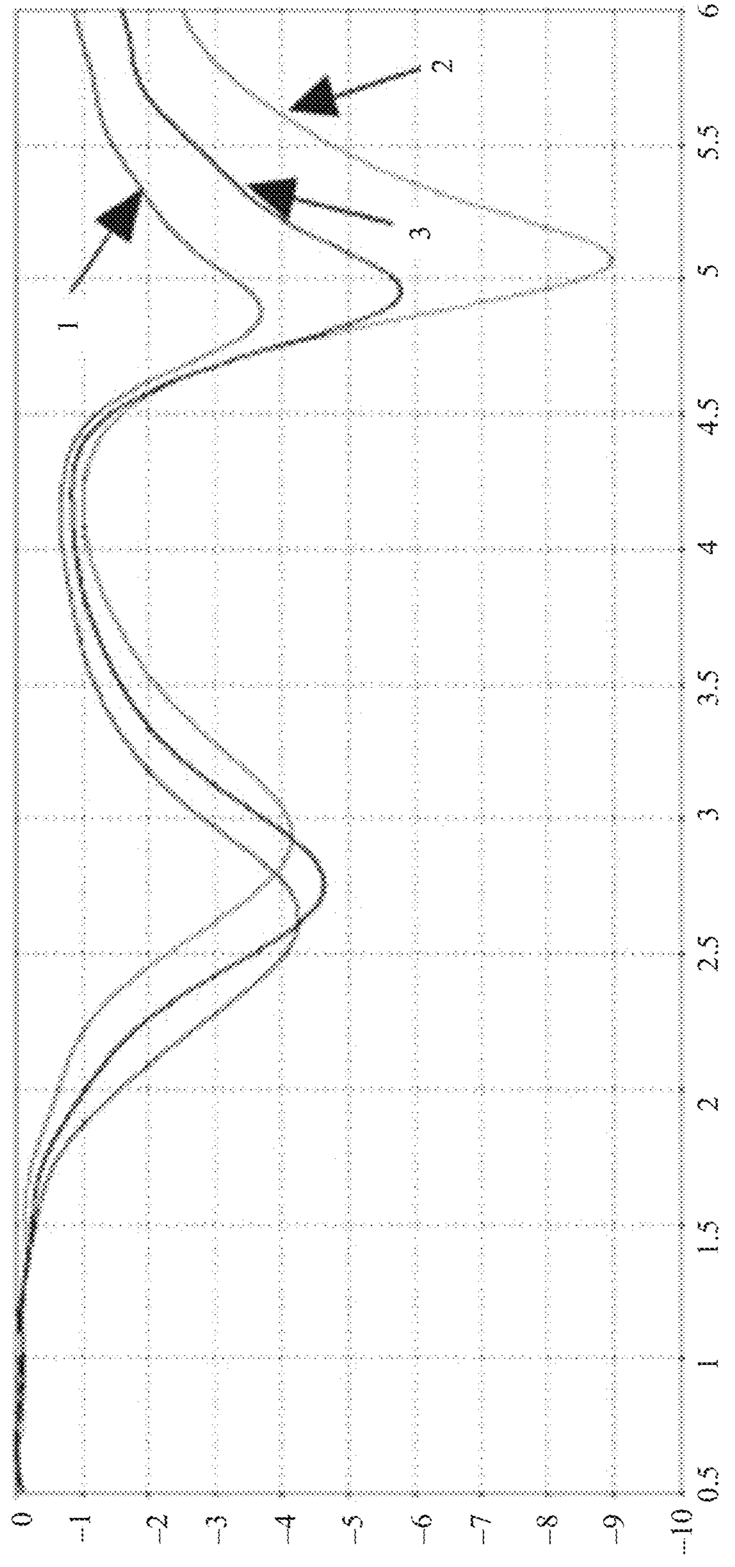
FIG. 15B is a diagram of S-parameter simulation of a second antenna when a size of a third body is changed according to an embodiment of the present invention.

In a third case, a length of the third body is adjusted, to adjust the S parameters of the first antenna and the second antenna. As shown in FIG. 15A and FIG. 15B, lengths of the third body that are represented by a curve 1, a curve 2, and a curve 3 are in an increasing trend. FIG. 15A is a diagram showing a variation of an S parameter of the first antenna when the length of the third body is changed. It may be learned from the diagram that when the length of the third body becomes larger, a resonance frequency of the first antenna moves toward a lower frequency, and when the length of the third body becomes smaller, the resonance frequency of the first antenna moves toward a higher frequency. Similarly, FIG. 15B is a diagram showing a variation of an S parameter of the second antenna when the length of the third body is changed. It may be learned from the diagram that when the length of the third body becomes larger, a resonance frequency of the second antenna moves toward a lower frequency, and when the length of the third body becomes smaller, the resonance frequency of the second antenna moves toward a higher frequency.

Figure 16A:
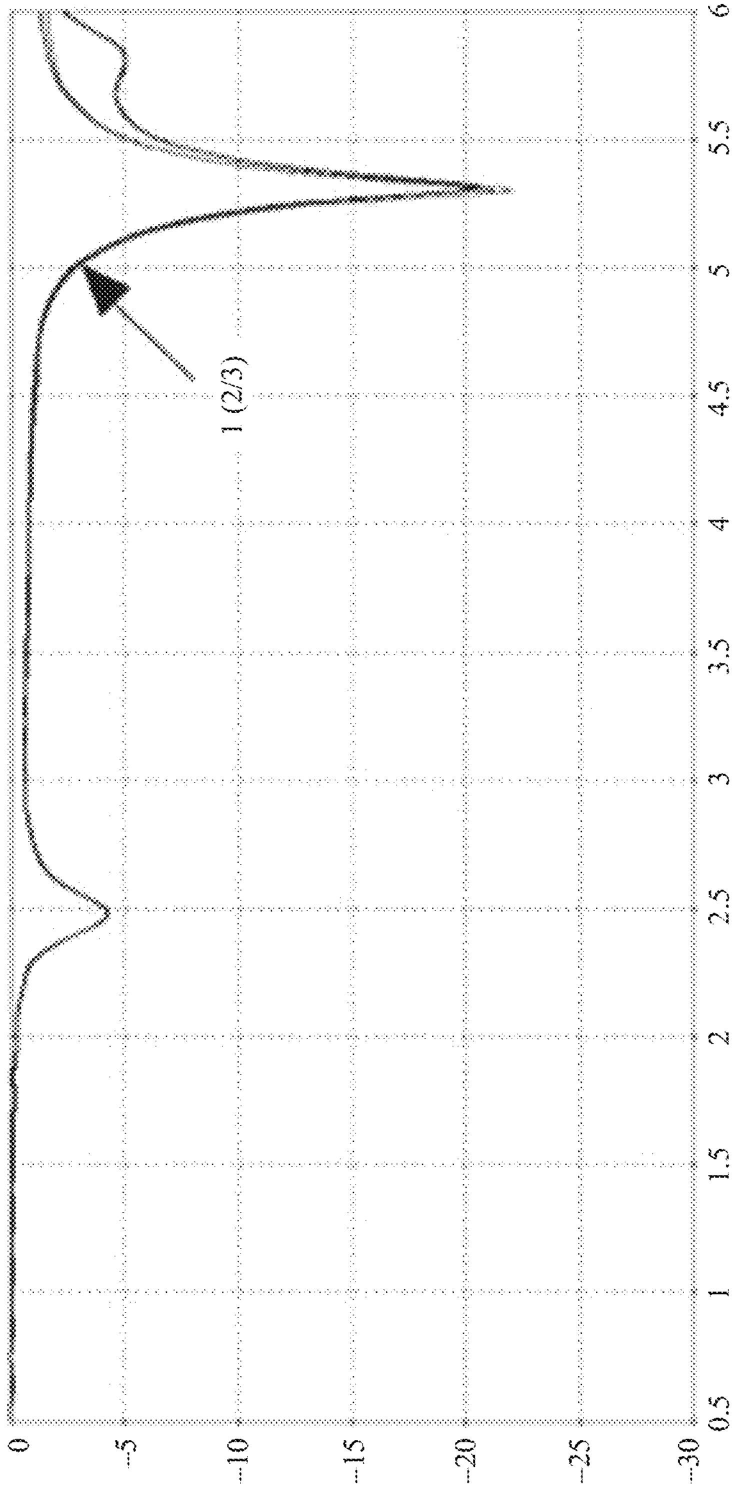
FIG. 16A is a diagram of S-parameter simulation of a first antenna when a size of a first parasitic stub is changed according to an embodiment of the present invention.
Figure 16B:
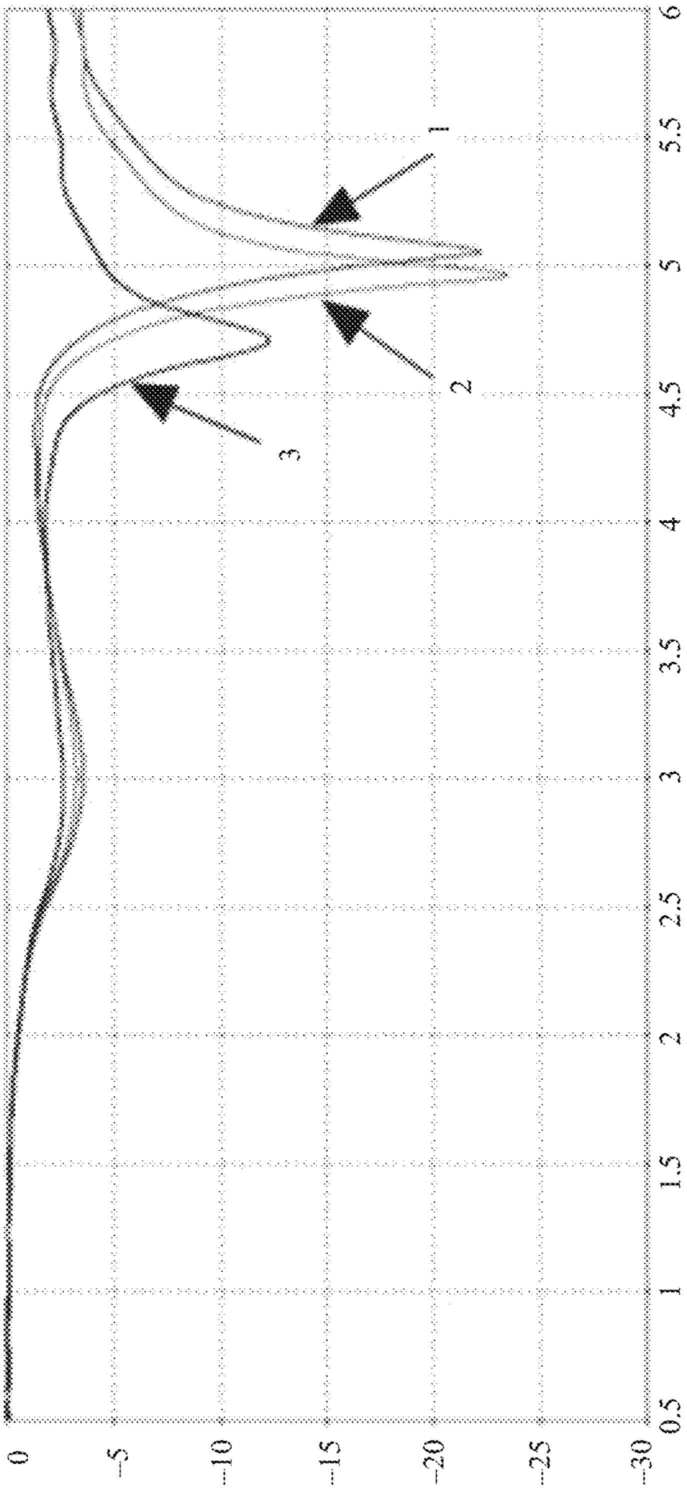
FIG. 16B is a diagram of S-parameter simulation of a second antenna when a size of a first parasitic stub is changed according to an embodiment of the present invention.

In a fourth case, the first parasitic stub is adjusted, to adjust the S parameters of the first antenna and the second antenna. As shown in FIG. 10, in this case, the first parasitic stub 38 is disposed on the substrate 190 in a three-dimensional architecture form. As shown in FIG. 16A and FIG. 16B, lengths of the first parasitic stub that are represented by a curve 1, a curve 2, and a curve 3 are in an increasing trend. FIG. 16A is a diagram showing a variation of an S parameter of the first antenna when the length of the first parasitic stub is changed. It may be learned from the diagram that a change of the length of the first parasitic stub has little impact on a resonance frequency of the first antenna. FIG. 16B is a diagram showing a variation of an S parameter of the second antenna when the length of the first parasitic stub is changed. It may be learned from the diagram that when the length of the first parasitic stub becomes larger, a resonance frequency of the second antenna moves toward a lower frequency, and when the length of the first parasitic stub becomes smaller, the resonance frequency of the second antenna moves toward a higher frequency.

Figure 17A:
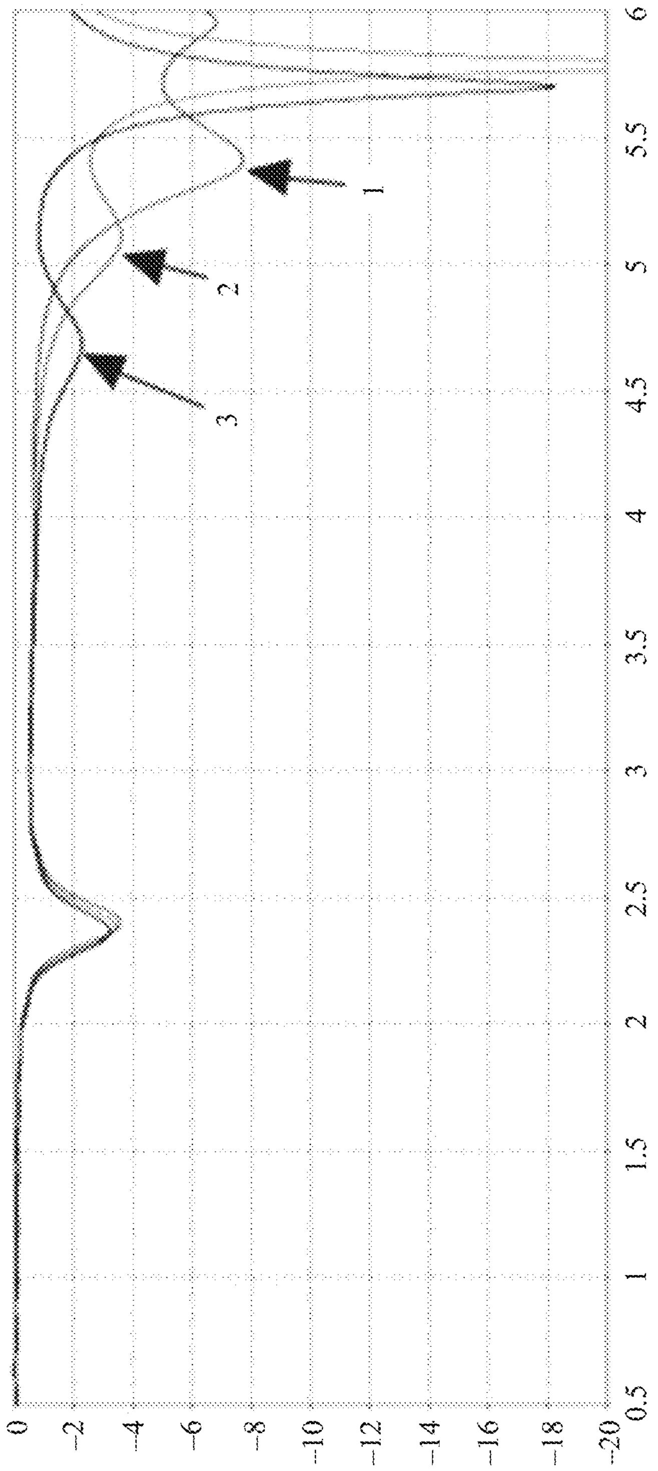
FIG. 17A is a diagram of S-parameter simulation of a first antenna en a size of a second parasitic stub is changed according to an embodiment of the present invention.
Figure 17B:
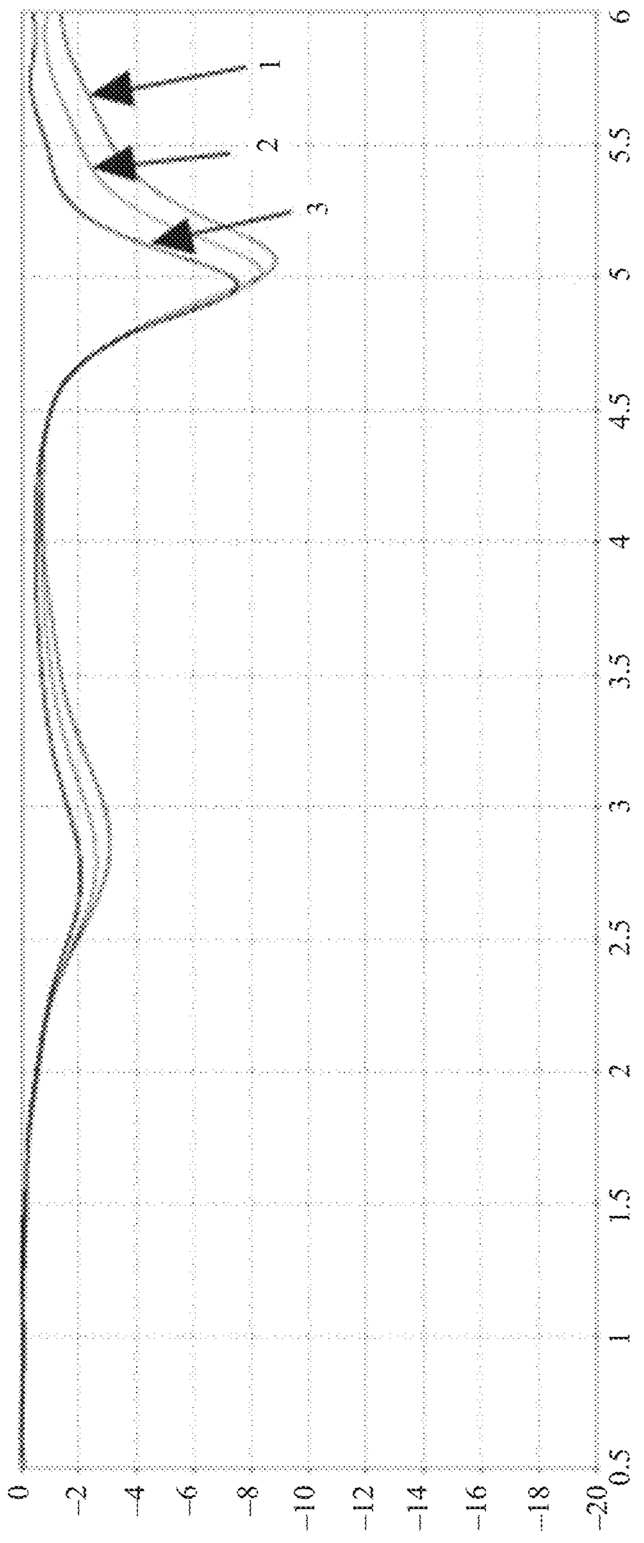
FIG. 17B is a diagram of S-parameter simulation of a second antenna when a size of a second parasitic stub is changed according to an embodiment of the present invention.

In a fifth case, the second parasitic stub is adjusted, to adjust the S parameters of the first antenna and the second antenna. As shown in FIG. 17A and FIG. 17B, lengths of the second parasitic stub that are represented by a curve 1, a curve 2, and a curve 3 are in an increasing trend. FIG. 17A is a diagram showing a variation of an S parameter of the first antenna when the length of the second parasitic stub is changed. It may be learned from the diagram that a change of the length of the second parasitic stub has little impact on a resonance frequency of the first antenna. FIG. 17B is a diagram showing a variation of an S parameter of the second antenna when the length of the second parasitic stub is changed. It may be learned from the diagram that when the length of the second parasitic stub becomes larger, a resonance frequency of the second antenna moves toward a lower frequency, and when the length of the second parasitic stub becomes smaller, the resonance frequency of the second antenna moves toward a higher frequency.

Figure 18A:
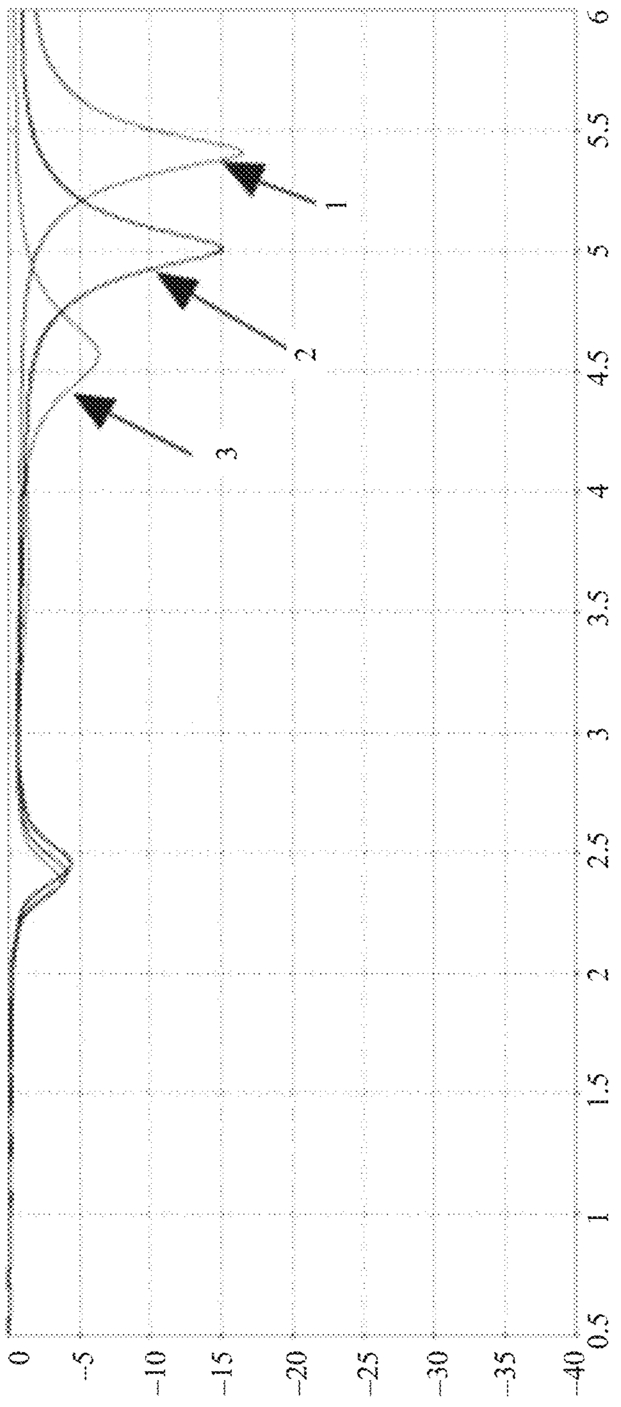
FIG. 18A is a diagram of S-parameter simulation of a first antenna when a size of a first parasitic stub is changed according to another embodiment of the present invention.
Figure 18B:
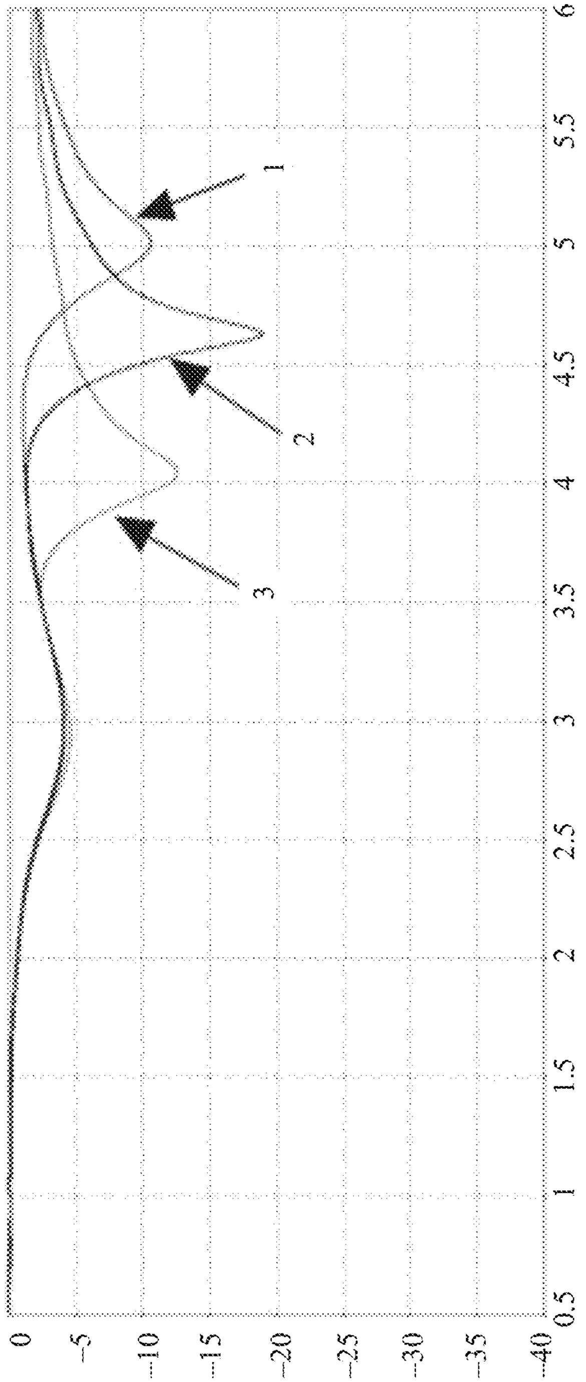
FIG. 18B is a diagram of S-parameter simulation of a second antenna when a size of a first parasitic stub is changed according to another embodiment of the present invention.

In a sixth case, the first parasitic stub is adjusted, to adjust the S parameters of the first antenna and the second antenna. As shown in FIG. 12, in this case, the first parasitic stub 38 is designed on the substrate 190 in a printing manner. As shown in FIG. 18A and FIG. 18B, lengths of the first parasitic stub that are represented by a curve 1, a curve 2, and a curve 3 are in an increasing trend. FIG. 18A is a diagram showing a variation of an S parameter of the first antenna when the length of the first parasitic stub is changed. It may be learned from the diagram that when the length of the first parasitic stub becomes larger, a second resonance frequency of the first antenna moves toward a lower frequency, and when the length of the first parasitic stub becomes smaller, the second resonance frequency of the first antenna moves toward a higher frequency. FIG. 18B is a diagram showing a variation of an S parameter of the second antenna when the length of the first parasitic stub is changed. It may be learned from the diagram that when the length of the first parasitic stub becomes larger, a second resonance frequency of the second antenna moves toward a lower frequency, and when the length of the first parasitic stub becomes smaller, the second resonance frequency of the second antenna moves toward a higher frequency.

Figure 19A:
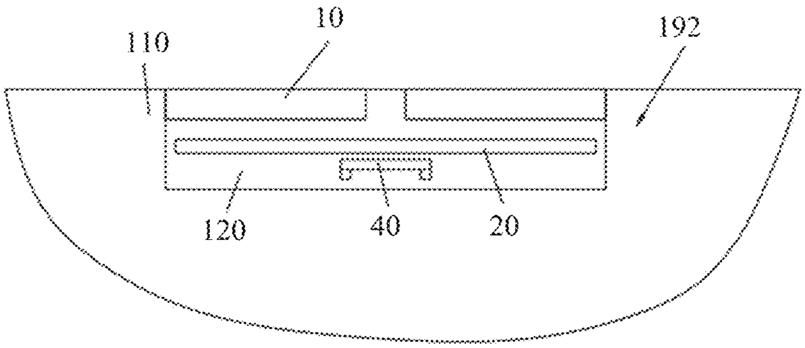
FIG. 19A is a diagram of a structure of a first board surface of an antenna apparatus according to a first embodiment of the present invention.
Figure 19B:
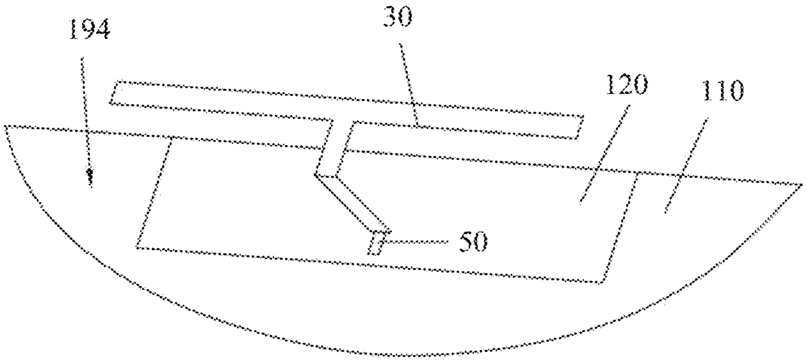
FIG. 19B is a diagram of a structure of a second board surface of the antenna apparatus according to the first embodiment of the present invention.

In a possible implementation, as shown in FIG. 19A and FIG. 19B, the substrate 190 includes a first board surface 192 and a second board surface 194 that are oppositely disposed; the first feeding structure 40, the first radiating element 10, and the second radiating element 20 are disposed on the first board surface 192, and the second radiating element 20 is located between the first feeding structure 40 and the first radiating element 10; and the second feeding structure 50 and the third radiating element 30 are disposed on the second board surface 194. On the one hand, the first radiating element 10 located on the first board surface 192 and the grounding area 110 form the slot antenna through enclosing. In this case, the slot antenna is also located on the first board surface 192. In this way, the first feeding structure 40 excites the slot antenna and the second radiating element 20 that are also located on the first board surface 192, to obtain the fundamental mode of the slot antenna and the fundamental mode of the second radiating element 20. On the other hand, the third radiating element 30 located on the second board surface 194 is excited by the second feeding structure 50 also located on the second board surface 194 to obtain the fundamental mode of the third radiating element 30, and the slot antenna located on the first board surface 192 uses the third radiating element 30 as an excitation source to obtain the second mode of the slot antenna. In this way, dual-antenna dual-band is implemented.

Figure 20A:
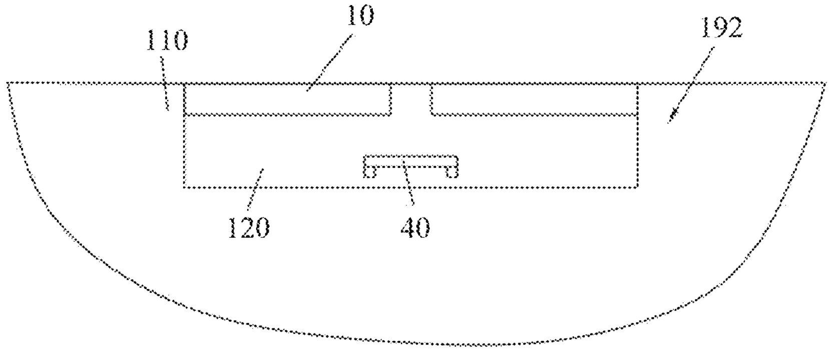
FIG. 20A is a diagram of a structure of a first board surface of an antenna apparatus according to a second embodiment of the present invention.
Figure 20B:
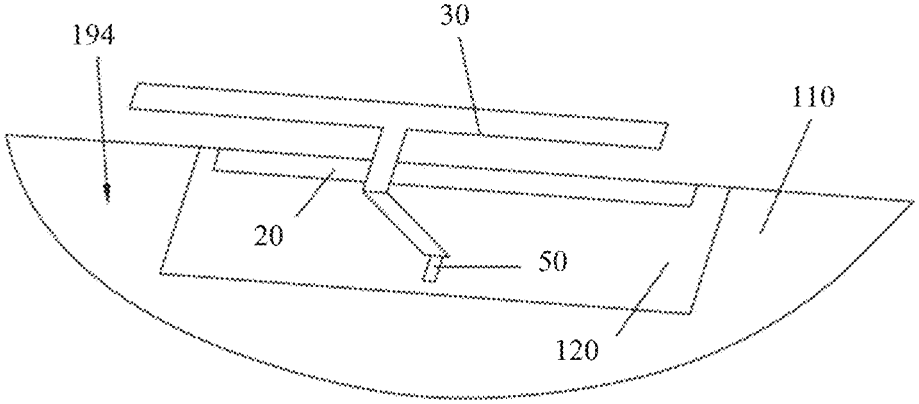
FIG. 20B is a diagram of a structure of a second board surface of the antenna apparatus according to the second embodiment of the present invention.

In a possible implementation, as shown in FIG. 20A and FIG. 20B, the substrate 190 includes a first board surface 192 and a second board surface 194 that are oppositely disposed; the first feeding structure 40 and the first radiating element 10 are disposed on the first board surface 194, and the second radiating element 20, the third radiating element 30, and the second feeding structure 50 are disposed on the second board surface 194; and the second radiating element 20 is a microstrip structure printed on the second board surface 194, and the third radiating element 30 is a three-dimensional architecture disposed on the second board surface 194. On the one hand, the first radiating element 10 located on the first board surface 192 and the grounding area 110 form the slot antenna through enclosing. In this case, the slot antenna is also located on the first board surface 192. In this way, the first feeding structure 40 excites the slot antenna in a magnetic coupling manner to generate a first resonance frequency. That is, the fundamental mode of the slot antenna is obtained. The first feeding structure 40 excites, in the magnetic coupling manner, the second radiating element 20 located on the second board surface 194, to obtain the fundamental mode of the second radiating element 20 and generate a second resonance frequency. On the other hand, the third radiating element 30 located on the second board surface 194 is excited by the second feeding structure 50 also located on the second board surface 194, to generate the first resonance frequency. That is, the fundamental mode of the third radiating element 30 is obtained. The third radiating element 30 is used as an excitation source to excite, in an electrical coupling manner, the slot antenna located on the first board surface 192, to generate the second resonance frequency and obtain the second mode of the slot antenna. In this way, dual-antenna dual-band is implemented.

Figure 21A:
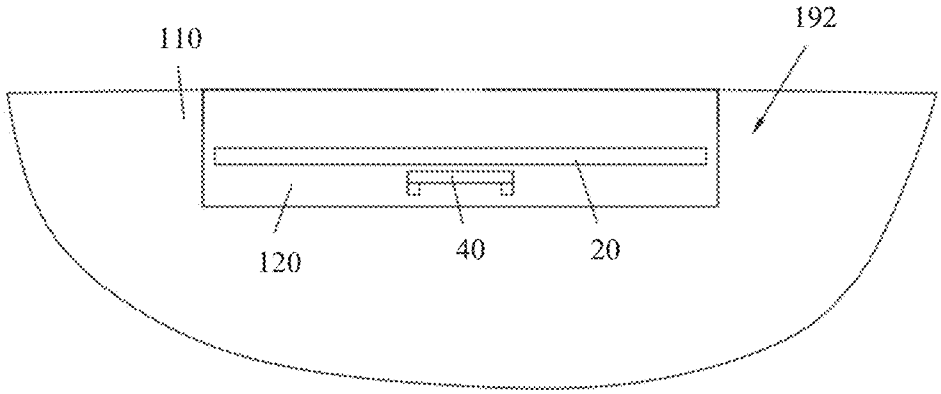
FIG. 21A is a diagram of a structure of a first board surface of an antenna apparatus according to a third embodiment of the present invention.
Figure 21B:
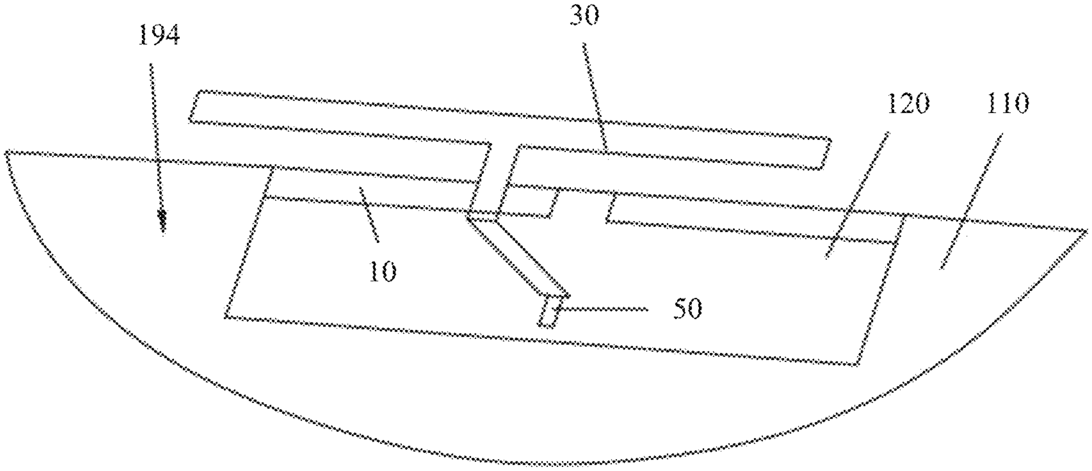
FIG. 21B is a diagram of a structure of a second board surface of the antenna apparatus according to the third embodiment of the present invention.

In a possible implementation as shown in FIG. 21A and FIG. 21B, the substrate 190 includes a first board surface 192 and a second board surface 194 that are oppositely disposed; the first feeding structure 40 and the second radiating element 20 are disposed on the first board surface 192, and the first radiating element 10, the third radiating element 30, and the second feeding structure 50 are disposed on the second board surface 194; and the first radiating element 10 is a microstrip structure printed on the second board surface 194, and the third radiating element 30 is a three-dimensional architecture disposed on the second board surface 194. In this implementation, the first radiating element 10 and the second radiating element 20 are respectively disposed on front and rear surfaces of the substrate 190. The first feeding structure 40 still uses a magnetic coupling feeding manner to excite the second radiating element 20, and a second resonance frequency is also generated. The first radiating element 10 is located on the second board surface 194, and the first radiating element 10 and the grounding area also jointly form the slot antenna with an opening. The first feeding structure 40 also uses the magnetic coupling manner to feed the slot antenna formed by the first radiating element 10 and the grounding area, to generate a first resonance frequency, that is, the fundamental model of the slot antenna. The third radiating element 60 located on the second board surface 194 is excited by the second feeding structure 50 also located on the second board surface 194, to generate the first resonance frequency and obtain the fundamental mode of the third radiating element 30. The third radiating element 30 is used as an excitation source to excite, in an electrical coupling manner, the slot antenna formed by the first radiating element 10 and the grounding area, to generate the second mode of the slot antenna, that is, the second resonance frequency. In this way, a dual-antenna dual-hand function is implemented.

The two ground terminals of the first radiating element 10 are electrically connected to the grounding area 110. The grounding area may be a ground plane on the substrate, for example, a ground copper foil. An electrical connection between the first radiating element 10 and the grounding area imposes no limitation that the first radiating element 10 and the grounding area 110 are located on a same layer of the substrate, for example, on a same surface of the substrate (the first board surface or the second board surface). For example, the grounding area may alternatively be on an intermediate layer of the substrate. When the first radiating element 10 and the grounding area 110 are located on different layers, the first radiating element 10 and the grounding area 110 may be electrically connected by using a through hole disposed on the substrate 190.

Figure 22A:
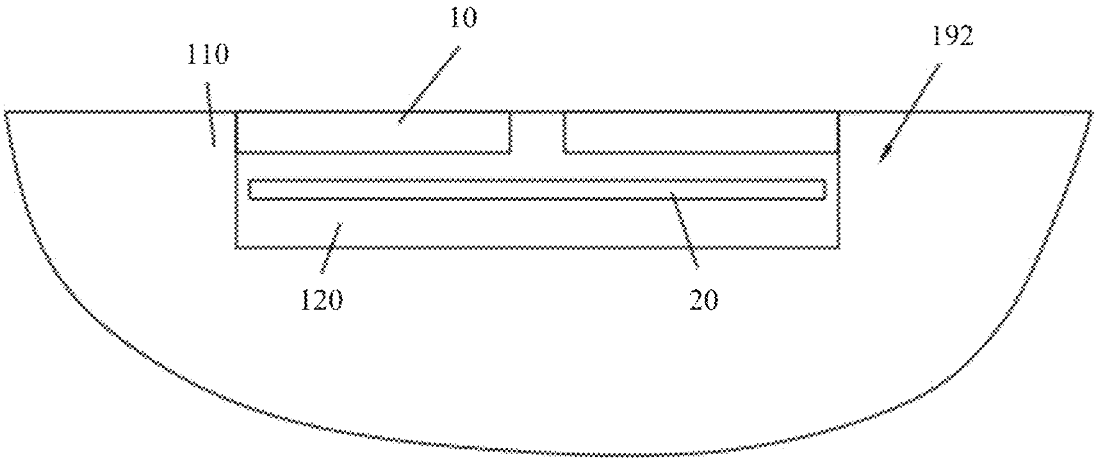
FIG. 22A is a diagram of a structure of a first board surface of an antenna apparatus according to a fourth embodiment of the present invention.
Figure 22B:
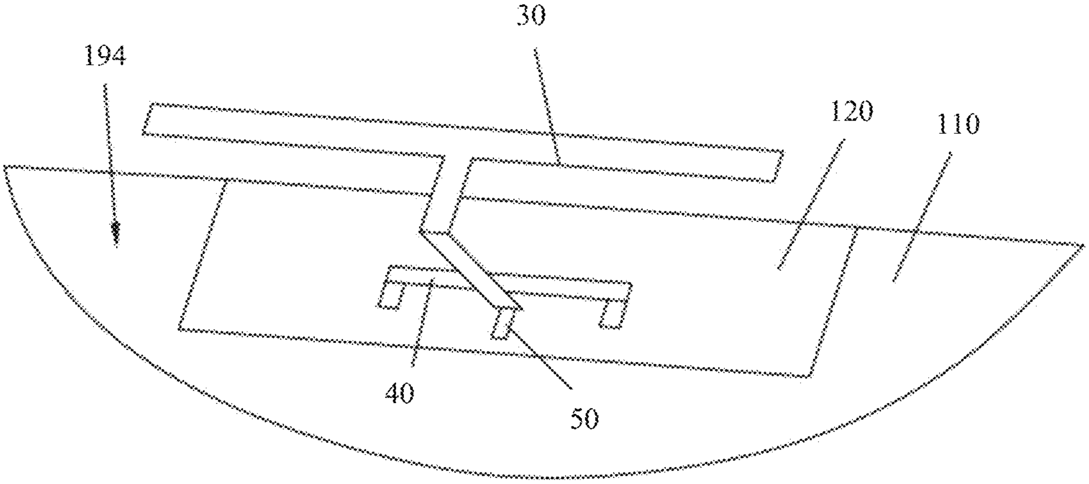
FIG. 22B is a diagram of a structure of a second board surface of the antenna apparatus according to the fourth embodiment of the present invention.

In a possible implementation, as shown in FIG. 22A and FIG. 22B, the substrate 190 includes a first board surface 192 and a second board surface 194 that are oppositely disposed; the first radiating element 10 and the second radiating element 40 are disposed on the first board surface 192, and the first feeding structure 40, the second feeding structure 50, and the third radiating element 30 are disposed on the second board surface 194. On the one hand, the first radiating element 10 located on the first board surface 192 and the grounding area 110 form the slot antenna through enclosing. In this case, the slot antenna is also located on the first board surface 192. The first feeding structure 40 located on the second board surface 194 excites the slot antenna and the second radiating element 20 that are located on the first board surface 192, to obtain the fundamental mode of the slot antenna and the fundamental mode of the second radiating element 20. On the other hand, the third radiating element 60 located on the second board surface 194 is excited by the second feeding structure 50 also located on the second board surface 194 to obtain the fundamental mode of the third radiating element 30, and the slot antenna located on the first board surface 192 uses the third radiating element 30 as an excitation source to obtain the second mode of the slot antenna. In this way, dual-antenna dual-band is implemented.

In a possible implementation, the first feeding structure 40, the second feeding structure 50, the first radiating element 10, the second radiating element 20, and the third radiating element 30 are disposed on a same side of the substrate 190. The first radiating element 10 located on one side of the substrate 190 and the grounding area 110 form the slot antenna through enclosing. The first feeding structure 40 located on a same board surface side as the slot antenna excites the slot antenna and the second radiating element 20, to obtain the fundamental mode of the slot antenna and the fundamental mode of the second radiating element 20. On the other hand, the third radiating element 30 located on the same board surface side is excited by the second feeding structure 50 also located on the side to obtain the fundamental mode of the third radiating element 30, and the slot antenna uses the third radiating element 30 as an excitation source to obtain the second mode of the slot antenna. In this way, dual-antenna dual-band is implemented.

Figure 23A:
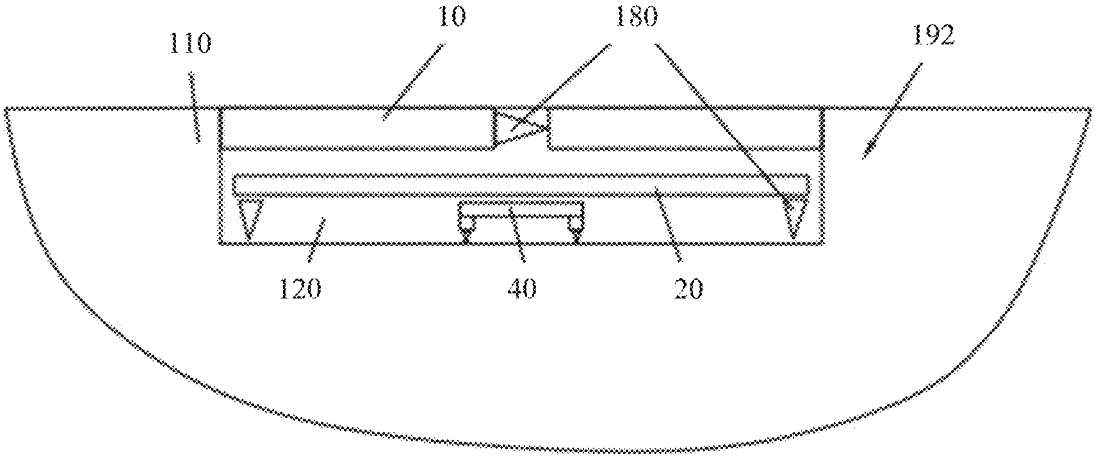
FIG. 23A is a schematic diagram of a structure of a first board surface to which a lumped element is added according to an embodiment of the present invention.
Figure 23B:
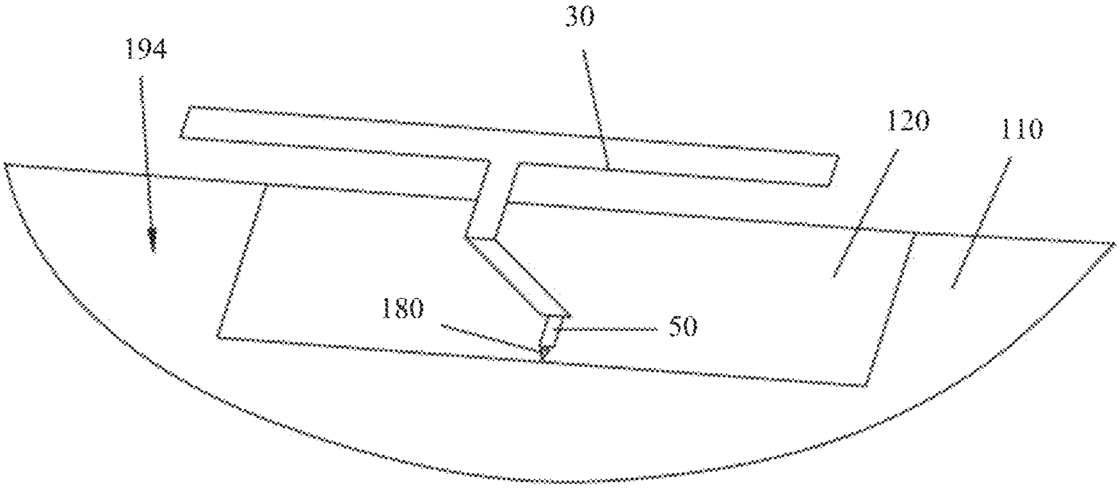
FIG. 23B is a schematic diagram of a structure of a second board surface to which a lumped element is added according to an embodiment of the present invention.

In some other specific embodiments, a lumped element 180 such as a capacitor or an inductor is loaded at a corresponding position of a component of the antenna apparatus 100, as specifically shown in FIG. 23A and FIG. 23B. The lumped element 180 in the figure may be designed to adjust resonance modes of the first radiating element 10, the second radiating element 20, and the third radiating element 30.

It should be noted that the first body, the second body, and the third body in the first radiating element, the second radiating element, and the third radiating element in the foregoing embodiment all extend along the first direction. Herein, the first body the second body, and the third body may be in a linear shape, or may be a structure in a curve shape, an arc shape, or a wavy shape with a main extension direction, and may be specifically adjusted based on an actual situation.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A device, comprising:

a substrate comprising a grounding area;

a clearance area adjacent to the grounding area; and an antenna apparatus comprising:
a first radiating element disposed in the clearance area and comprising:
an opening comprising:
a first side; and
a second side;
a first ground terminal located on the first side and electrically coupled to the grounding area; and
a second ground terminal located on the second side and electrically coupled to the grounding area,
wherein the first radiating element and the grounding area jointly form a slot antenna;
a second radiating element disposed in the clearance area and separated from the grounding area;
a first feeding structure located at the clearance area, grounded, and configured to:
excite the slot antenna in a magnetic coupling manner to generate a first resonance frequency; and
excite the second radiating element to generate a second resonance frequency;
a third radiating element configured to excite the slot antenna in an electrical coupling manner to generate the second resonance frequency; and
a second feeding structure located at the clearance area and grounded,
wherein the second feeding structure is electrically coupled to the third radiating element and is configured to excite the third radiating element to generate the first resonance frequency,
wherein a first resonance mode of the slot antenna and a second resonance mode of the third radiating element are orthogonal in polarization at the first resonance frequency, and
wherein a third resonance mode of the second radiating element and a fourth resonance mode of the slot antenna are orthogonal in polarization at the second resonance frequency.

2. The device of claim 1, wherein the first radiating element further comprises a first body extending along a first direction, wherein the first ground terminal and the second ground terminal are located at two ends of the first body, wherein the opening is located in a first middle area of the first body, wherein the second radiating element comprises a second body extending along the first direction, and wherein the third radiating element comprises:
a third body extending along the first direction; and
a feeding stub coupled between the third body and the grounding area and forming a first included angle with the third body,
wherein a first junction between the feeding stub and the grounding area is the second feeding structure.

3. The device of claim 2, wherein the first radiating element is in a strip shape, and wherein the first feeding structure is disposed in a second middle area of the slot antenna.

4. The device of claim 3, wherein the first feeding structure comprises:
a first port electrically coupled to the grounding area;
a first tuning element electrically coupled to the grounding area; and
a connection line coupled between the first port and the first tuning element,
wherein the grounding area, the first port, the connection line, and the first tuning element jointly form an annular loop, and
wherein the annular loop is configured to excite the slot antenna and the second radiating element in the magnetic coupling manner.

5. The device of claim 2, wherein the first body extends in a linear shape, or wherein a first center of the first body coincides with a second center of the opening.

6. The device of claim 5, wherein the first radiating element further comprises a first branch coupled to the first body, and wherein a first extension direction of the first branch forms a second included angle with a second extension direction of the first body.

7. The device of claim 2, wherein the first radiating element is in a strip shape, and wherein the second feeding structure is disposed in a second middle area of the slot antenna.

8. The device of claim 7, wherein the feeding stub is perpendicular to the third body, or wherein a second junction between the feeding stub and the third body is located at a center of the third body.

9. The device of claim 7, wherein the third radiating element is a three-dimensional architecture disposed on the substrate, wherein a first part of the feeding stub is coplanar with the third body, and wherein a second part of the feeding stub forms a second included angle with a surface of the substrate.

10. The device of claim 9, wherein the third radiating element further comprises a first stub coupled between a central position of the third body and the substrate.

11. The device of claim 7, wherein the third radiating element is a microstrip structure printed on the substrate.

12. The device of claim 1, wherein the substrate comprises:
a first board surface; and
a second board surface disposed oppositely to the first board surface,
wherein the first feeding structure, the first radiating element, and the second radiating element are disposed on the first board surface, wherein the second radiating element is located between the first feeding structure and the first radiating element, and wherein the second feeding structure and the third radiating element are disposed on the second board surface,
wherein the first feeding structure and the first radiating element are disposed on the first board surface, wherein the second radiating element, the third radiating element, and the second feeding structure are disposed on the second board surface, wherein the second radiating element is a microstrip structure printed on the second board surface, and wherein the third radiating element is disposed on the second board surface,
wherein the first feeding structure and the second radiating element are disposed on the first board surface, wherein the first radiating element, the third radiating element, and the second feeding structure are disposed on the second board surface, wherein the first radiating element is the microstrip structure, and wherein the third radiating element is disposed on the second board surface, or
wherein the first radiating element and the second radiating element are disposed on the first board surface, and wherein the first feeding structure, the second feeding structure, and the third radiating element are disposed on the second board surface.

13. The device of claim 1, wherein the first feeding structure, the second feeding structure, the first radiating element, the second radiating element, and the third radiating element are disposed on a same side of the substrate.

14. A device, comprising:

a substrate comprising a grounding area;

a clearance area adjacent to the grounding area; and an antenna apparatus comprising:

a first radiating element disposed in the clearance area and comprising:

an opening comprising:

a first side; and a second side;

a first ground terminal located on the first side and electrically coupled to the grounding area; and a second ground terminal located on the second side and electrically coupled to the grounding area, wherein the first radiating element and the grounding area jointly form a slot antenna;

a second radiating element disposed in the clearance area and separated from the grounding area;

a first feeding structure located at the clearance area, grounded, and configured to:

excite the slot antenna in a magnetic coupling manner to generate a first resonance frequency; and excite the second radiating element to generate a second resonance frequency;

a third radiating element configured to excite the slot antenna in an electrical coupling manner to generate the second resonance frequency; and a second feeding structure located at the clearance area and grounded, wherein the second feeding structure is electrically coupled to the third radiating element and is configured to excite the third radiating element to generate the first resonance frequency, wherein the first radiating element further comprises a first body extending along a first direction, wherein the first ground terminal and the second ground terminal are located at two ends of the first body, wherein the opening is located in a first middle area of the first body, wherein the second radiating element comprises a second body extending along the first direction, wherein either the second body is located in a slot of the slot antenna or wherein the second body and the first body are oppositely disposed on two sides of the substrate, and wherein the third radiating element comprises:

a third body extending along the first direction; and a feeding stub coupled between the third body and the grounding area and forming a first included angle with the third body, wherein a first junction between the feeding stub and the grounding area is the second feeding structure.

15. The device of claim 14, wherein the second body extends in a linear shape, or wherein a connection line between a first center of the second body and a second center of the opening is perpendicular to the first direction.

16. The device of claim 15, wherein the second radiating element further comprises a second branch coupled to the second body, and wherein a first extension direction of the second branch forms a second included angle with a second extension direction of the second body.

17. A device, comprising:

a substrate comprising a grounding area;

a clearance area adjacent to the grounding area; and an antenna apparatus comprising:

a first radiating element disposed in the clearance area and comprising:

an opening comprising:

a first side; and a second side;

a first ground terminal located on the first side and electrically coupled to the grounding area; and a second ground terminal located on the second side and electrically coupled to the grounding area, wherein the first radiating element and the grounding area jointly form a slot antenna, and wherein the first radiating element is in a strip shape;

a second radiating element disposed in the clearance area and separated from the grounding area;

a first feeding structure located at the clearance area, grounded, and configured to:

excite the slot antenna in a magnetic coupling manner to generate a first resonance frequency; and excite the second radiating element to generate a second resonance frequency;

a third radiating element configured to excite the slot antenna in an electrical coupling manner to generate the second resonance frequency;

a second feeding structure located at the clearance area and grounded, wherein the second feeding structure is electrically coupled between the third radiating element and is configured to excite the third radiating element to generate the first resonance frequency, and wherein the second feeding structure is disposed in a second middle area of the slot antenna, wherein the first radiating element further comprises a first body extending along a first direction, wherein the first ground terminal and the second ground terminal are located at two ends of the first body, wherein the opening is located in a first middle area of the first body, wherein the second radiating element comprises a second body extending along the first direction, and wherein the third radiating element comprises:

a third body extending along the first direction; and a feeding stub coupled between the third body and the grounding area and forming a first included angle with the third body, wherein a first junction between the feeding stub and the grounding area is the second feeding structure; and two first parasitic stubs distributed on two sides of the second feeding structure or two second parasitic stubs disposed at positions of two ends of the third body.

18. The device of claim 17, wherein the first parasitic stubs or the second parasitic stubs are microstrip structures printed on the substrate.

19. The device of claim 17, wherein the first parasitic stubs or the second parasitic stubs are three-dimensional architectures disposed on a surface of the substrate.

* * * * *